US008640052B2

(12) United States Patent
Dasgupta et al.

(10) Patent No.: US 8,640,052 B2
(45) Date of Patent: Jan. 28, 2014

(54) USER INTERFACE ENHANCEMENTS FOR MEDIA CONTENT ACCESS SYSTEMS AND METHODS

(75) Inventors: Mousumi Dasgupta, Irving, TX (US); Enrique Ruiz-Velasco, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 396 days.

(21) Appl. No.: 12/651,182

(22) Filed: Dec. 31, 2009

(65) Prior Publication Data

US 2011/0161882 A1    Jun. 30, 2011

(51) Int. Cl.
*G06F 3/048*  (2013.01)
*G06F 3/00*   (2006.01)

(52) U.S. Cl.
USPC ............ 715/848; 715/834; 715/836; 715/841; 715/849; 715/850; 715/851; 715/852; 715/719; 715/720; 715/721; 725/39; 725/42; 725/44

(58) Field of Classification Search
USPC ......... 715/830, 848–852, 834, 836, 719–721; 725/39, 42, 44
See application file for complete search history.

(56) References Cited

U.S. PATENT DOCUMENTS

| | | |
|---|---|---|
| 4,977,455 A | 12/1990 | Young |
| 5,151,789 A | 9/1992 | Young |
| 5,253,066 A | 10/1993 | Vogel |
| 5,307,173 A | 4/1994 | Yuen et al. |
| 5,335,079 A | 8/1994 | Yuen et al. |
| 5,353,121 A | 10/1994 | Young et al. |
| 5,382,983 A | 1/1995 | Kwoh et al. |
| 5,479,266 A | 12/1995 | Young et al. |
| 5,479,268 A | 12/1995 | Young et al. |
| 5,485,197 A * | 1/1996 | Hoarty ............................ 725/37 |
| 5,499,103 A | 3/1996 | Mankovitz |
| 5,512,963 A | 4/1996 | Mankovitz |
| 5,515,173 A | 5/1996 | Mankovitz et al. |
| 5,532,732 A | 7/1996 | Yuen et al. |
| 5,532,754 A | 7/1996 | Young et al. |
| 5,541,738 A | 7/1996 | Mankovitz |
| 5,550,576 A | 8/1996 | Klosterman |
| 5,553,123 A | 9/1996 | Chan et al. |
| 5,559,550 A | 9/1996 | Mankovitz |
| 5,600,711 A | 2/1997 | Yuen |
| 5,619,274 A | 4/1997 | Roop et al. |
| 5,623,613 A * | 4/1997 | Rowe et al. ................... 715/841 |
| 5,640,484 A | 6/1997 | Mankovitz |
| 5,684,525 A | 11/1997 | Klosterman |
| 5,701,383 A | 12/1997 | Russo et al. |
| 5,706,145 A | 1/1998 | Hindman et al. |
| 5,727,060 A | 3/1998 | Young |

(Continued)

*Primary Examiner* — Steven B Theriault

(57) ABSTRACT

Exemplary user interface enhancements for media content access systems and methods are described herein. An exemplary method includes a media content access system launching a graphical user interface for display, the graphical user interface initially including a graphical representation of a channel guide comprising a grid matrix of channel icons representing a plurality of media content channels through which media content is accessible by the media content access system and a graphical representation of an advertisement displayed together with the channel guide in the graphical user interface, detecting a user navigation event within the channel guide displayed in the graphical user interface, and replacing, in response to the user navigation event, the graphical representation of the advertisement with a graphical representation of content specific to a media content channel within the plurality of media content channels. Corresponding user interfaces, systems, and methods are also disclosed.

19 Claims, 19 Drawing Sheets

(56) References Cited

U.S. PATENT DOCUMENTS

| | | | |
|---|---|---|---|
| 5,734,786 A | 3/1998 | Mankovitz | |
| 5,790,198 A | 8/1998 | Roop et al. | |
| 5,801,787 A | 9/1998 | Schein et al. | |
| 5,808,608 A | 9/1998 | Young et al. | |
| 5,809,204 A | 9/1998 | Young et al. | |
| 5,812,205 A | 9/1998 | Milnes et al. | |
| 5,822,123 A * | 10/1998 | Davis et al. | 725/43 |
| 5,828,945 A | 10/1998 | Klosterman | |
| 5,850,218 A * | 12/1998 | LaJoie et al. | 725/45 |
| 5,870,150 A | 2/1999 | Yuen | |
| 5,886,690 A * | 3/1999 | Pond et al. | 715/720 |
| 5,886,746 A | 3/1999 | Yuen et al. | |
| 5,915,026 A | 6/1999 | Mankovitz | |
| 5,923,362 A | 7/1999 | Klosterman | |
| 5,940,073 A | 8/1999 | Klosterman et al. | |
| 5,949,954 A | 9/1999 | Young et al. | |
| 5,956,025 A * | 9/1999 | Goulden et al. | 715/716 |
| 5,959,688 A | 9/1999 | Schein et al. | |
| 5,969,748 A | 10/1999 | Casement et al. | |
| 5,970,206 A | 10/1999 | Yuen et al. | |
| 5,974,222 A | 10/1999 | Yuen et al. | |
| 5,987,213 A | 11/1999 | Mankovitz et al. | |
| 5,988,078 A | 11/1999 | Levine | |
| 5,991,498 A | 11/1999 | Young | |
| 6,002,394 A | 12/1999 | Schein et al. | |
| 6,005,565 A * | 12/1999 | Legall et al. | 715/721 |
| 6,016,141 A | 1/2000 | Knudson et al. | |
| 6,025,837 A * | 2/2000 | Matthews et al. | 715/721 |
| 6,028,599 A | 2/2000 | Yuen et al. | |
| 6,037,933 A * | 3/2000 | Blonstein et al. | 715/721 |
| 6,049,652 A | 4/2000 | Yuen et al. | |
| 6,052,145 A | 4/2000 | Macrae et al. | |
| 6,072,983 A | 6/2000 | Klosterman | |
| 6,075,551 A | 6/2000 | Berezowski et al. | |
| 6,075,575 A | 6/2000 | Schein et al. | |
| 6,078,348 A | 6/2000 | Klosterman et al. | |
| 6,091,882 A | 7/2000 | Yuen et al. | |
| 6,118,492 A | 9/2000 | Milnes et al. | |
| 6,128,009 A * | 10/2000 | Ohkura et al. | 725/46 |
| 6,133,909 A | 10/2000 | Schein et al. | |
| 6,137,950 A | 10/2000 | Yuen | |
| 6,141,003 A * | 10/2000 | Chor et al. | 715/719 |
| 6,144,401 A | 11/2000 | Casement et al. | |
| 6,151,059 A * | 11/2000 | Schein et al. | 725/37 |
| 6,167,188 A | 12/2000 | Young et al. | |
| 6,177,931 B1 * | 1/2001 | Alexander et al. | 725/52 |
| 6,182,098 B1 * | 1/2001 | Selker | 715/202 |
| 6,208,335 B1 * | 3/2001 | Gordon et al. | 715/721 |
| 6,211,921 B1 * | 4/2001 | Cherian et al. | 348/565 |
| 6,216,265 B1 | 4/2001 | Roop et al. | |
| 6,239,794 B1 | 5/2001 | Yuen et al. | |
| 6,247,176 B1 | 6/2001 | Schein et al. | |
| 6,262,722 B1 * | 7/2001 | Allison et al. | 725/39 |
| 6,263,501 B1 | 7/2001 | Schein et al. | |
| 6,323,911 B1 | 11/2001 | Schein et al. | |
| 6,341,195 B1 | 1/2002 | Mankovitz et al. | |
| 6,341,374 B2 | 1/2002 | Schein et al. | |
| 6,388,714 B1 | 5/2002 | Schein et al. | |
| 6,396,546 B1 | 5/2002 | Alten et al. | |
| 6,405,371 B1 * | 6/2002 | Oosterhout et al. | 725/39 |
| 6,411,337 B2 * | 6/2002 | Cove et al. | 348/563 |
| 6,412,110 B1 | 6/2002 | Schein et al. | |
| 6,421,067 B1 * | 7/2002 | Kamen et al. | 715/719 |
| 6,430,358 B1 | 8/2002 | Yuen et al. | |
| 6,430,359 B1 | 8/2002 | Yuen et al. | |
| 6,453,471 B1 | 9/2002 | Klosterman | |
| 6,460,181 B1 | 10/2002 | Donnelly | |
| 6,466,734 B2 | 10/2002 | Yuen et al. | |
| 6,469,753 B1 | 10/2002 | Klosterman et al. | |
| 6,477,705 B1 | 11/2002 | Yuen et al. | |
| 6,498,895 B2 | 12/2002 | Young et al. | |
| 6,505,348 B1 | 1/2003 | Knowles et al. | |
| 6,526,577 B1 * | 2/2003 | Knudson et al. | 725/40 |
| 6,538,672 B1 * | 3/2003 | Dobbelaar | 715/810 |
| 6,538,701 B1 | 3/2003 | Yuen | |
| 6,549,719 B2 | 4/2003 | Mankovitz | |
| 6,564,379 B1 | 5/2003 | Knudson et al. | |
| 6,567,606 B2 | 5/2003 | Milnes et al. | |
| 6,588,013 B1 | 7/2003 | Lumley et al. | |
| 6,600,501 B1 * | 7/2003 | Israel et al. | 715/810 |
| 6,664,984 B2 * | 12/2003 | Schlarb et al. | 715/826 |
| 6,668,133 B2 | 12/2003 | Yuen et al. | |
| 6,678,891 B1 * | 1/2004 | Wilcox et al. | 725/42 |
| 6,687,906 B1 | 2/2004 | Yuen et al. | |
| 6,690,391 B1 * | 2/2004 | Proehl et al. | 715/720 |
| 6,704,028 B2 * | 3/2004 | Wugofski | 715/719 |
| 6,732,369 B1 | 5/2004 | Schein et al. | |
| 6,742,183 B1 | 5/2004 | Reynolds et al. | |
| 6,745,391 B1 | 6/2004 | Macrae et al. | |
| 6,756,997 B1 * | 6/2004 | Ward et al. | 715/716 |
| 6,760,537 B2 | 7/2004 | Mankovitz | |
| 6,772,433 B1 * | 8/2004 | LaJoie et al. | 725/52 |
| 6,799,326 B2 | 9/2004 | Boylan et al. | |
| 6,799,327 B1 * | 9/2004 | Reynolds et al. | 725/42 |
| 6,839,705 B1 * | 1/2005 | Grooters | 1/1 |
| 6,850,693 B2 | 2/2005 | Young et al. | |
| 6,859,799 B1 | 2/2005 | Yuen | |
| 6,938,208 B2 * | 8/2005 | Reichardt | 715/719 |
| 6,978,473 B1 * | 12/2005 | Nsonwu et al. | 725/52 |
| 7,036,091 B1 * | 4/2006 | Nguyen | 715/834 |
| 7,036,092 B2 * | 4/2006 | Sloo et al. | 715/841 |
| 7,039,935 B2 | 5/2006 | Knudson et al. | |
| 7,065,709 B2 * | 6/2006 | Ellis et al. | 715/719 |
| 7,069,576 B1 | 6/2006 | Knudson et al. | |
| 7,076,734 B2 * | 7/2006 | Wolff et al. | 715/720 |
| 7,096,431 B2 * | 8/2006 | Tambata et al. | 715/834 |
| 7,103,905 B2 * | 9/2006 | Novak | 725/46 |
| 7,117,440 B2 * | 10/2006 | Gordon et al. | 715/721 |
| 7,155,675 B2 * | 12/2006 | Billmaier et al. | 715/720 |
| 7,159,177 B2 * | 1/2007 | Billmaier et al. | 715/720 |
| 7,174,126 B2 * | 2/2007 | McElhatten et al. | 455/3.04 |
| 7,178,111 B2 * | 2/2007 | Glein et al. | 715/848 |
| 7,203,952 B2 * | 4/2007 | Broadus | 725/40 |
| 7,373,652 B1 * | 5/2008 | Bayrakeri et al. | 725/53 |
| 7,444,665 B2 * | 10/2008 | Cezeaux et al. | 725/112 |
| 7,487,529 B1 | 2/2009 | Orlick | |
| 7,552,459 B2 * | 6/2009 | Klosterman et al. | 725/42 |
| 7,577,973 B1 * | 8/2009 | Kapner et al. | 725/44 |
| 7,634,789 B2 * | 12/2009 | Gerba et al. | 725/44 |
| 7,685,619 B1 * | 3/2010 | Herz | 725/52 |
| 7,761,812 B2 * | 7/2010 | Ostojic et al. | 715/835 |
| 7,834,883 B2 * | 11/2010 | Adams | 345/581 |
| 8,006,264 B2 * | 8/2011 | Reynolds et al. | 725/39 |
| 8,065,603 B2 * | 11/2011 | Gossweiler et al. | 715/227 |
| 8,117,564 B2 * | 2/2012 | Woods et al. | 715/850 |
| 2001/0012020 A1 * | 8/2001 | Stautner et al. | 345/721 |
| 2001/0029610 A1 | 10/2001 | Corvin et al. | |
| 2001/0030667 A1 * | 10/2001 | Kelts | 345/854 |
| 2001/0047298 A1 | 11/2001 | Moore et al. | |
| 2001/0054181 A1 | 12/2001 | Corvin | |
| 2002/0073424 A1 | 6/2002 | Ward et al. | |
| 2002/0124255 A1 | 9/2002 | Reichardt et al. | |
| 2002/0138834 A1 * | 9/2002 | Gerba et al. | 725/42 |
| 2002/0184627 A1 * | 12/2002 | Alba et al. | 725/39 |
| 2003/0001898 A1 * | 1/2003 | Bernhardson | 345/786 |
| 2003/0001907 A1 * | 1/2003 | Bergsten et al. | 345/853 |
| 2003/0005439 A1 * | 1/2003 | Rovira | 725/37 |
| 2003/0005445 A1 | 1/2003 | Schein et al. | |
| 2003/0014752 A1 * | 1/2003 | Zaslavsky et al. | 725/40 |
| 2003/0018748 A1 * | 1/2003 | McKenna, Jr. | 709/219 |
| 2003/0056219 A1 | 3/2003 | Reichardt et al. | |
| 2003/0084445 A1 * | 5/2003 | Pilat | 725/44 |
| 2003/0090524 A1 * | 5/2003 | Segerberg et al. | 345/786 |
| 2003/0110495 A1 | 6/2003 | Bennington et al. | |
| 2003/0110499 A1 | 6/2003 | Knudson et al. | |
| 2003/0115599 A1 | 6/2003 | Bennington et al. | |
| 2003/0115602 A1 | 6/2003 | Knee et al. | |
| 2003/0163813 A1 | 8/2003 | Klosterman et al. | |
| 2003/0164858 A1 | 9/2003 | Klosterman et al. | |
| 2003/0169302 A1 * | 9/2003 | Davidsson et al. | 345/810 |
| 2003/0188310 A1 | 10/2003 | Klosterman et al. | |
| 2003/0188311 A1 | 10/2003 | Yuen et al. | |
| 2003/0196201 A1 | 10/2003 | Schein et al. | |
| 2003/0204847 A1 | 10/2003 | Ellis et al. | |

(56) References Cited

U.S. PATENT DOCUMENTS

| | | | |
|---|---|---|---|
| 2003/0208756 A1 | 11/2003 | Macrae et al. | |
| 2004/0002987 A1* | 1/2004 | Clancy et al. | 707/101 |
| 2004/0008229 A1* | 1/2004 | Hultcrantz | 345/810 |
| 2004/0010806 A1 | 1/2004 | Yuen et al. | |
| 2004/0045025 A1 | 3/2004 | Ward et al. | |
| 2004/0100484 A1* | 5/2004 | Barrett | 345/719 |
| 2004/0103432 A1* | 5/2004 | Barrett | 725/39 |
| 2004/0107437 A1 | 6/2004 | Reichardt et al. | |
| 2004/0107439 A1* | 6/2004 | Hassell et al. | 725/44 |
| 2004/0128683 A1* | 7/2004 | Ko | 725/39 |
| 2004/0140995 A1* | 7/2004 | Goldthwaite et al. | 345/716 |
| 2004/0154040 A1* | 8/2004 | Ellis | 725/58 |
| 2004/0168189 A1 | 8/2004 | Reynolds et al. | |
| 2004/0194138 A1 | 9/2004 | Boylan et al. | |
| 2004/0221307 A1* | 11/2004 | Arai et al. | 725/44 |
| 2004/0243942 A1* | 12/2004 | Cortright | 715/769 |
| 2004/0261098 A1 | 12/2004 | Macrae et al. | |
| 2005/0010949 A1 | 1/2005 | Ward et al. | |
| 2005/0015804 A1* | 1/2005 | LaJoie et al. | 725/44 |
| 2005/0028201 A1 | 2/2005 | Klosterman et al. | |
| 2005/0076361 A1* | 4/2005 | Choi et al. | 725/45 |
| 2005/0097603 A1* | 5/2005 | Kikinis | 725/44 |
| 2005/0102634 A1* | 5/2005 | Sloo | 715/823 |
| 2005/0108752 A1* | 5/2005 | Nishikawa et al. | 725/39 |
| 2005/0125823 A1 | 6/2005 | McCoy et al. | |
| 2005/0149964 A1 | 7/2005 | Thomas et al. | |
| 2005/0155056 A1 | 7/2005 | Knee et al. | |
| 2005/0193408 A1* | 9/2005 | Sull et al. | 725/32 |
| 2005/0216936 A1 | 9/2005 | Knudson et al. | |
| 2005/0235321 A1* | 10/2005 | Ahmad-Taylor | 725/56 |
| 2005/0251824 A1 | 11/2005 | Thomas et al. | |
| 2005/0257166 A1* | 11/2005 | Tu | 715/787 |
| 2005/0278737 A1* | 12/2005 | Ma et al. | 725/40 |
| 2006/0026647 A1* | 2/2006 | Potrebic et al. | 725/53 |
| 2006/0146436 A1* | 7/2006 | Goodwin et al. | 360/69 |
| 2006/0156336 A1 | 7/2006 | Knudson et al. | |
| 2006/0212894 A1 | 9/2006 | Knudson et al. | |
| 2006/0218588 A1* | 9/2006 | Kelts | 725/39 |
| 2006/0224987 A1* | 10/2006 | Caffarelli | 715/767 |
| 2006/0253874 A1* | 11/2006 | Stark et al. | 725/62 |
| 2006/0277574 A1 | 12/2006 | Schein et al. | |
| 2006/0288366 A1 | 12/2006 | Boylan et al. | |
| 2007/0016926 A1 | 1/2007 | Ward et al. | |
| 2007/0033613 A1 | 2/2007 | Ward et al. | |
| 2007/0061724 A1* | 3/2007 | Slothouber et al. | 715/716 |
| 2007/0107010 A1 | 5/2007 | Jolna et al. | |
| 2008/0104058 A1* | 5/2008 | Billmaier et al. | 707/5 |
| 2008/0122870 A1* | 5/2008 | Brodersen et al. | 345/634 |
| 2008/0126989 A1* | 5/2008 | Flores et al. | 715/833 |
| 2008/0270449 A1* | 10/2008 | Gossweiler et al. | 707/102 |
| 2009/0031338 A1* | 1/2009 | Sharkey | 725/32 |
| 2009/0063552 A1* | 3/2009 | Jones | 707/102 |
| 2009/0064222 A1* | 3/2009 | Dawson et al. | 725/38 |
| 2009/0089834 A1* | 4/2009 | Parker et al. | 725/39 |
| 2009/0165048 A1* | 6/2009 | Nishimura | 725/39 |
| 2009/0210910 A1* | 8/2009 | Smith et al. | 725/56 |
| 2009/0249393 A1* | 10/2009 | Shelton et al. | 725/39 |
| 2010/0031193 A1* | 2/2010 | Stark et al. | 715/810 |
| 2010/0262938 A1* | 10/2010 | Woods et al. | 715/850 |
| 2010/0306801 A1* | 12/2010 | Filippov et al. | 725/44 |
| 2011/0074918 A1* | 3/2011 | Klappert et al. | 348/43 |
| 2011/0078634 A1* | 3/2011 | Klappert et al. | 715/850 |
| 2011/0137727 A1* | 6/2011 | Chung et al. | 705/14.55 |
| 2011/0167385 A1* | 7/2011 | Charrue et al. | 715/825 |

\* cited by examiner

USER INTERFACE ENHANCEMENTS FOR MEDIA CONTENT ACCESS SYSTEMS AND METHODS

BACKGROUND INFORMATION

The advent of set-top boxes and other media content access devices has provided users of such devices with access to a large number and variety of media content programs, services, and choices. For example, a user may choose to experience a variety of distributed media content, including broadcast or multicast television programs, pay-per-view programming, video-on-demand programming, and audio programming via a set-top box.

A set-top box typically generates and provides data representative of graphical user interfaces ("GUIs") that may be displayed to a user, who may utilize the GUIs to control operations and access functionality of the set-top box. For example, a set-top box typically provides menu GUIs through which a user may access various functions of the set-top box. As another example, a set-top box typically provides media program guide GUIs through which a user may identify and access media content. While conventional set-top box GUIs provide a user with tools to interact with a set-top box, there remains room to improve set-top box GUIs and related functionality. Thus, designers of GUIs for set-top boxes seek to design improved GUIs that provide an intuitive and appropriate balance of information, advertisements, usability, aesthetics, and functionality.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
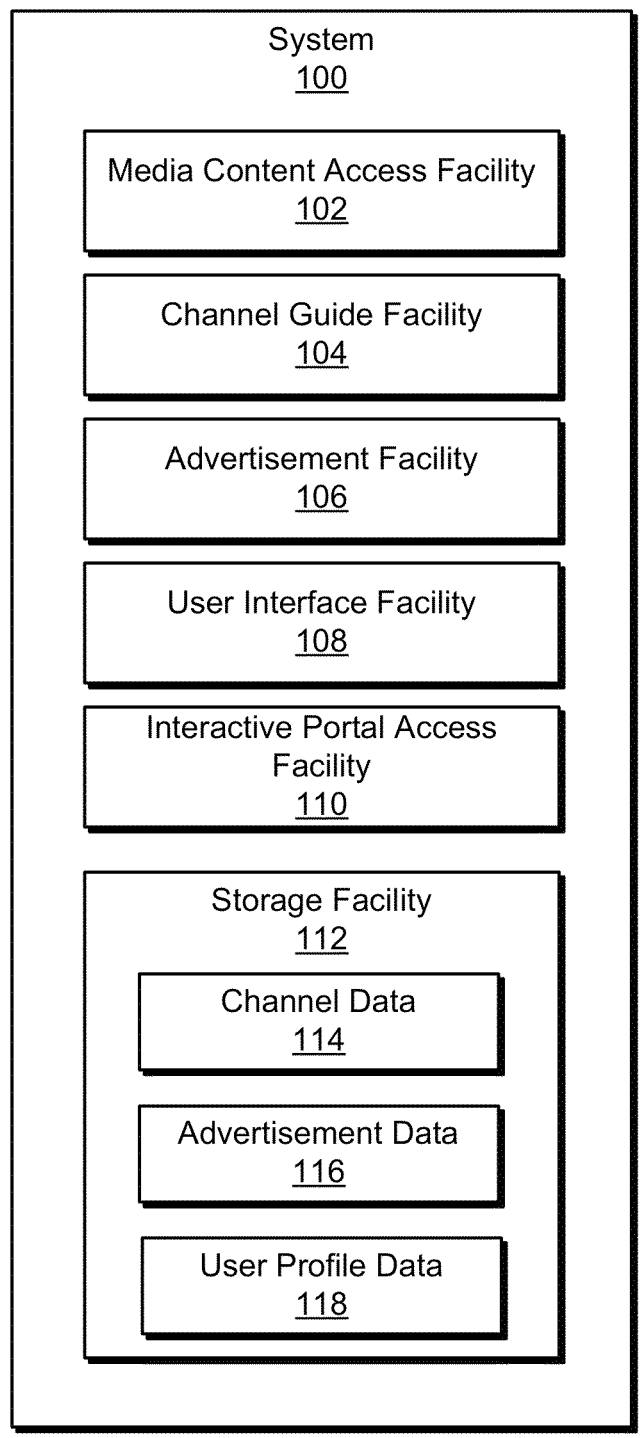
FIG. 1 illustrates an exemplary media content access system according to principles described herein.

Exemplary user interfaces and user interface enhancements for media content access systems and methods are described herein. As described in more detail below, in certain embodiments, advertisement content may be integrated within exemplary graphical user interfaces ("GUIs"), such as GUIs displaying media channel and/or program guides, in a way that may provide an appropriate balance of information, advertisements, usability, aesthetics, and/or functionality to a user who views and/or interacts with the GUIs. As an example, one or more graphical representations of one or more advertisements promoting products and/or services may be displayed together with a graphical representation of a channel guide that includes a plurality of channel icons representing a plurality of media content channels through which media content may be accessed. As described in more detail further below, advertisement content may be selected for display together with the channel guide in the GUI in response to a launch of the GUI and/or a user navigation event within the channel guide.

In some examples, the channel icons may provide launching points through which interactive portals associated with media content providers distributing media content via the media content channels may be accessed. In some examples, the channel guide may include channel icons arranged to form a three-dimensional grid matrix view of channel icons, and the channel icons may be positioned relative to a graphical representation of a three-dimensional stage in GUI.

As used herein, the term "media content" may refer generally to any content that may be accessed and/or presented by a media content access system for experiencing by a user of the media content access system. The term "media content program" as used herein may refer generally to any instance of media content, including any television program, on-demand media program, pay-per-view media program, broadcast media program (e.g., broadcast television program), multicast media program, narrowcast media program, IPTV program, video program, streamed media program, recorded live transmission of a media program, and any other form of media content that may be accessed and presented by the media content access system.

The term "media content channel," "media channel," or "channel" as used herein may refer generally to any carrier of media content, including, but not limited to, media (e.g., television) channels, streams, addresses, frequencies or other carriers of media content. In some examples, the media content channels may include frequency bands to which media content access facility may tune to access media content carried over the frequency bands. Additionally or alternatively, the media content channels may include virtual channels that are mapped to frequency bands to which media content access facility may tune to access media content carried over the frequency bands.

As used herein, the term "advertisement" or "advertisement content" may refer to any advertisement promoting a product and/or service and that is configured to be displayed for viewing by a user. An advertisement may be in the form of one or more graphical representations (e.g., visual images) of advertisement content that may be displayed for viewing by a user. Typically, an advertisement may be designed to attract the attention of a user when the advertisement is displayed in a GUI and/or to prompt the user to take steps toward acquiring an advertised product and/or service.

Exemplary user interface enhancements for media content access systems and methods will now be described with reference to the accompanying drawings.

FIG. 1 illustrates an exemplary media content access system 100 (or simply "system 100"). As will be described in more detail below, system 100 may be configured to access and present media content, as well as to generate and provide one or more GUIs for viewing and utilization by a user (e.g., an end user such as a subscriber to one or more services accessible by system 100).

System 100 may include, without limitation, a media content access facility 102, a channel guide facility 104, an advertisement facility 106, a user interface facility 108, an interactive portal access facility 110, and a storage facility 112 selectively and communicatively coupled to one another. Any suitable communication technologies, including any of the communication technologies mentioned herein, may be employed to facilitate communications between facilities 102-112. Each of these facilities will now be described in more detail.

Media content access facility 102 may be configured to access, process, and present media content for experiencing by a user. Media content access facility 102 may employ any technologies suitable for accessing media content, including accessing media content distributed by a remote source. In certain embodiments, media content access facility 102 may be configured to access media content that is distributed over one or more media content channels. In certain examples, each media content channel may be associated with and carry media content provided by a certain media content provider, such as American Broadcasting Company ("ABC"), for example. Accordingly, media content access facility 102 may select (e.g., tune to) a particular media content channel to access media content provided by a particular media content provider associated with the media content channel.

Media content access facility 102 may be configured to process and present media content for experiencing by a user. A presentation of media content may be performed in any suitable way such as by generating and/or providing output signals representative of media content to a display device (e.g., a television) and/or an audio output device. For example, media content access facility 102 may display, play back, or otherwise present a media content program for experiencing by a user.

Channel guide facility 104 may be configured to maintain channel data representative of one or more media content channels through which media content access facility 102 may access media content. The channel data may be stored as channel data 114 in storage facility 112. Channel data 114 may include any information descriptive of or otherwise related to the media content channels. For example, channel data 114 may include, without limitation, data representative of channel identifiers (e.g., virtual channel numbers), channel frequency ranges, mappings of virtual channels to frequency ranges, information about media content providers associated with media channels, and graphical images associated media content channels (e.g., channel logos and/or media content provider logos).

Channel data 114 may be utilized by channel guide facility 104 to generate a channel guide for presentation to a user. A channel guide may include any compilation of channel data 114 that may be presented to a user. The user may utilize the channel guide to identify and/or access media content associated with a media channel. A channel guide may be integrated within an interactive media program guide in some embodiments or presented independently of an interactive media program guide in other embodiments. Exemplary graphical representations of channel guides are described in more detail further below.

Advertisement facility 106 may be configured to maintain advertisement data representative of one or more advertisements that may be presented to a user. The advertisement data may be stored as advertisement data 116 in storage facility 112. Advertisement data 116 may include any data representative of, descriptive of, or otherwise related to advertisements. For example, advertisement data 116 may include, without limitation, data representative of advertisement content (e.g., advertisements images, artwork, and text) as well as advertisement metadata, which may be descriptive of one or more attributes of advertisement content. Exemplary graphical representations of advertisements are described in more detail further below.

In certain embodiments, advertisement facility 106 may be configured to select personalized advertisements for presentation to a user. For example, advertisement facility 106 may analyze advertisement metadata and information about the user and select an advertisement that is likely of interest to the user based on the analysis. To this end, advertisement facility 106 may access user profile data 118 stored in storage facility 112 and which may include a user profile containing information about a user. A user's profile may specify one or more preferences of a user, historical media content access data associated with the user (e.g., data indicating one or more media channels and/or media content programs accessed by the user), and any other information about the user that may be helpful for selecting a personalized advertisement for presentation to the user.

In certain embodiments, advertisement data 116 may be managed by an entity (e.g., a person or organization) controlling delivery of media content to media content access facility 102. For example, an entity that delivers media content from media content providers to end users may manage advertisement data 116. The management of advertisement data 116 may include, but is not limited to, creating, compiling, and providing graphical advertisement content to be displayed in one or more GUIs.

User interface facility 108 may be configured to generate and launch one or more GUIs for display to a user. A launch of a GUI may include any process for facilitating a display of a GUI that was not displayed immediately prior to the launch. In certain examples, a launch of a GUI may include an initial instantiation of a GUI in response to user input requesting that the GUI be displayed. In other examples, a launch of a GUI may include an activation and/or selection of an already-instantiated GUI in response to user input requesting that the GUI be displayed. In other examples, a launch may include transforming a GUI from a non-displayed state to a displayed state on a display screen.

User interface facility 108 may be configured to access and utilize channel data 114 maintained by channel guide facility 104 and/or advertisement data 116 maintained by advertisement facility 106 to generate and launch a GUI for display. For example, user interface facility 108 may be configured to request a channel guide from channel guide facility 104 and one or more advertisements from advertisement facility 106 for inclusion in the GUI. Channel guide facility 104 may respond by providing data representative of a channel guide, and advertisement facility 106 may respond by providing data representative of one or more advertisements for inclusion in the GUI. Hence, in certain embodiments, the GUI may include a graphical representation of a channel guide representing media content channels through which media content may be accessed by media content access facility 102, and a graphical representation of at least one advertisement displayed together with the channel guide in the GUI. The channel guide and the advertisement may be displayed together in the GUI in a manner that is designed to provide an intuitive and appropriate balance of information, advertisements, usability, aesthetics, and functionality. For example, the advertisement may be integrally displayed together with the channel guide in the GUI on a temporary basis until an occurrence of a predetermined event is detected. In response to the detected event, the advertisement may be replaced in the GUI, for example. Examples of GUI views including channel guides and/or advertisements are described in more detail further below in reference to the drawings.

User interface facility 108 may be further configured to control the contents of a GUI. For example, user interface facility 108 may initially populate a GUI with content such as a graphical representation of a channel guide and a graphical representation of an advertisement. Subsequently, user interface facility 108 may modify the contents of the GUI such as by adding new content to the GUI, removing content from the GUI, modifying content in the GUI, and replacing content in the GUI with new content. As described in more detail further below, for example, user interface facility 108 may replace a graphical representation of an advertisement with a graphical representation of other content, such as content specific to a media content channel in the channel guide of the GUI.

User interface facility 108 may be configured to receive user input and provide user output and may include any hardware, firmware, software, or combination thereof supportive of user interface input and output capabilities. Accordingly, user interface facility 108 may receive input from and provide output to a user. In certain embodiments, user interface facility 108 may be configured to detect user input indicating an occurrence of a predetermined event in a GUI. For example, user interface facility 108 may detect user input indicating an event such as a user navigation event or a user selection event. A user navigation event may include any user-initiated navigation within a channel guide and/or GUI. In certain embodiments, for example, a user navigation event may include a browsing event that moves a selector within a channel guide displayed in a GUI (e.g., from one channel icon to another channel icon). A user selection event may include any user-initiated selection of an object included in a channel guide and/or GUI, such as a selection of a channel icon in a channel guide displayed in a GUI. Examples of a user navigation event and a user selection event are described in more detail further below.

Interactive portal access facility 110 may be configured to access one or more interactive portals. As used herein, an interactive portal may include any platform through which content associated with a media content channel may be accessed. The content may include information, media content, advertisements, other content, services, service offers, and/or any other material specific to the media content channel and/or a media content provider associated with the media content channel. In certain embodiments, an interactive portal may be operated by a media content provider associated with a media content channel such that content accessible through the interactive portal is provided by the media content provider. In alternative embodiments, an interactive portal may be operated at least in part by an entity that facilitates delivery of media content to media content access facility 102 via a media content channel.

To illustrate, a media content channel may be associated with a media content provider such as Home Box Office ("HBO"). HBO may maintain an interactive portal through which interactive portal access facility 110 may access information, media content, advertisements, other content, services, service offers, and/or any other material provided by HBO. Such an interactive portal may be used by HBO to promote HBO's brand, disseminate information, promote media content, and/or promote a service (e.g., an HBO subscription package) on a platform that is conveniently accessible by interactive portal access facility 110.

In certain embodiments, a channel icon in a channel guide may be configured to function as a launching point to an interactive portal such that when a user selects the channel icon in a GUI, interactive portal access facility 110 respond by accessing the interactive portal for the media content channel associated with the channel icon.

Storage facility 112 may be configured to store data, including channel data 114, advertisement data 116, user profile data 118, and any other electronic data as may suit a particular implementation. Storage facility 112 may include and/or employ any suitable data storage technologies.

System 100, including facilities 102-112, may include any computer hardware and/or computer-implemented instructions (e.g., software), or combinations of computer-implemented instructions and hardware, configured to perform one or more of the processes described herein. In particular, system 100 may be implemented on one physical computing device or may be implemented on more than one physical computing device. Accordingly, system 100 may include any number of computing devices, and may employ any of a number of computer operating systems. Moreover, it will be recognized that although facilities 102-112 are shown to be separate facilities in FIG. 1, any of those facilities may be combined into a single facility as may serve a particular application.

Accordingly, one or more of the processes described herein may be implemented at least in part as instructions executable by one or more computing devices. In general, a processor (e.g., a microprocessor) receives instructions, from a computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, a DVD, any other optical medium, a RAM, a PROM, an EPROM, a FLASH-EEPROM, any other memory chip or cartridge, or any other medium from which a computer can read.

Figure 2:
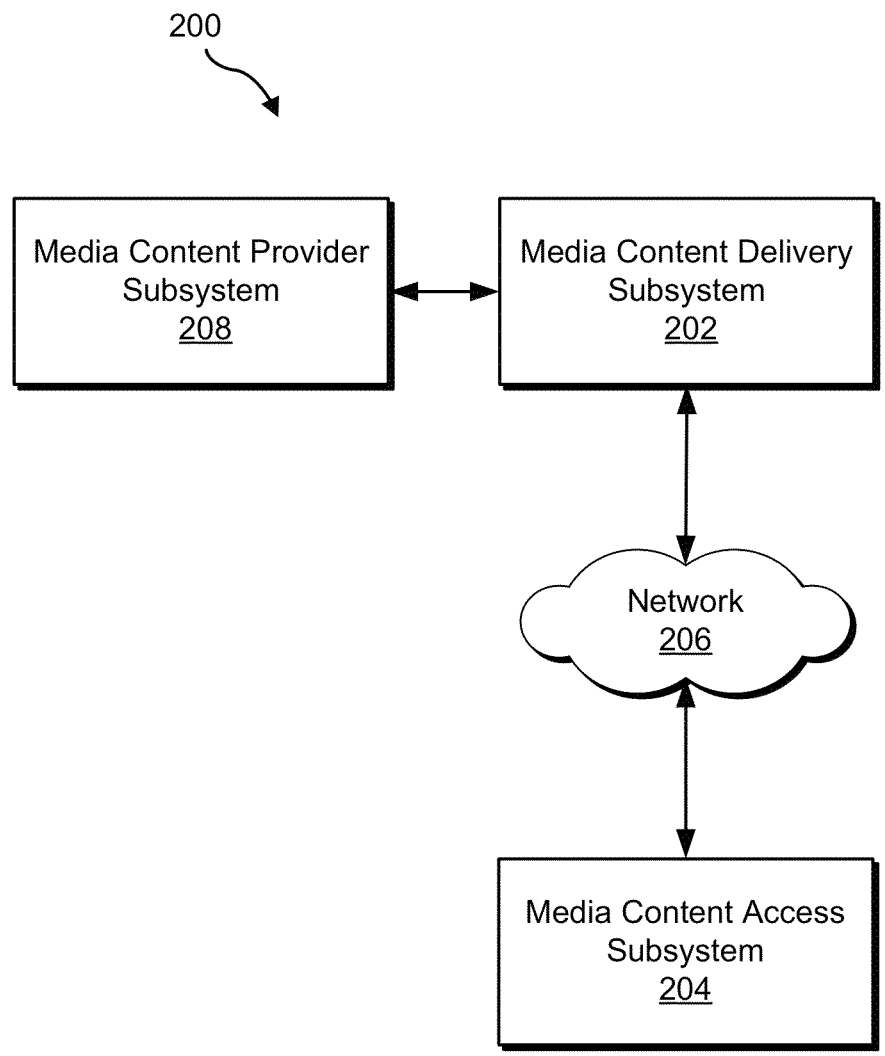
FIG. 2 illustrates an exemplary implementation of the system of FIG. 1 according to principles described herein.

FIG. 2 illustrates an exemplary implementation 200 of system 100 wherein a media content delivery subsystem 202 (or simply "delivery subsystem 202") is communicatively coupled to a media content access subsystem 204 (or simply "access subsystem 204"). As will be described in more detail below, media content access facility 102, channel guide facility 104, advertisement facility 106, user interface facility 108, interactive portal access facility 110, and storage facility 112 may each be implemented on one or both of delivery subsystem 202 and access subsystem 204.

Access subsystem 204 may be configured to communicate with and receive a signal and/or data stream containing data representative of media content and/or data associated with media content (e.g., metadata, program guide data, etc.) from delivery subsystem 202. Access subsystem 204 and delivery subsystem 202 may communicate using any suitable communication technologies, devices, networks, media, and protocols supportive of remote data communications.

For example, as shown in FIG. 2, delivery subsystem 202 may be configured to communicate with access subsystem 204 over a network 206 (and communications links thereto). Network 206 may include one or more networks or types of networks capable of carrying communications and/or data signals between delivery subsystem 202 and access subsystem 204. For example, network 206 may include, but is not limited to, a cable network, optical fiber network, hybrid fiber coax network, wireless network (e.g., a Wi-Fi and/or mobile telephone network), satellite network, wireless broadcast network (e.g., a satellite media broadcasting network or terrestrial broadcasting network), subscriber television network, a provider-specific network (e.g., a Verizon® FIOS® network), the Internet, an intranet, local area network, any other suitable network, and any combination or sub-combination of these networks.

Delivery subsystem 202 and access subsystem 204 may communicate over network 206 using any suitable communication technologies, devices, media, and protocols supportive of remote data communications, including, but not limited to, data transmission media, communications devices, Transmission Control Protocol ("TCP"), Internet Protocol ("IP"), File Transfer Protocol ("FTP"), Telnet, Hypertext Transfer Protocol ("HTTP"), Real Time Protocol ("RTP"), User Datagram Protocol ("UDP"), Ethernet, and any other suitable communications technologies, devices, media, and protocols.

While FIG. 2 shows delivery subsystem 202 and access subsystem 204 communicatively coupled via network 206, it will be recognized that delivery subsystem 202 and access subsystem 204 may be configured to communicate one with another in any other suitable manner (e.g., via a direct connection).

In some examples, delivery subsystem 202 may be configured to deliver media content to access subsystem 204. Access subsystem 204 may be configured to facilitate access by a user to media content received from delivery subsystem 202. To this end, access subsystem 204 may present the media content for experiencing (e.g., viewing) by a user, record the media content, parse metadata and/or other data associated with the media content, etc.

As shown in FIG. 2, delivery subsystem 202 may be communicatively coupled to a media content provider subsystem 208 (or simply "provider subsystem 208), which may provide media content to delivery subsystem 202 for distribution over network 206. In certain embodiments, provider subsystem 208 may include or be implemented by one or computing devices operated by a media content provider (e.g., HBO) and that are configured to provide data representative of media content to delivery subsystem 202. Delivery subsystem 202 may distribute the media content associated with the media content provider over network 206 via a media content channel.

Figure 3:
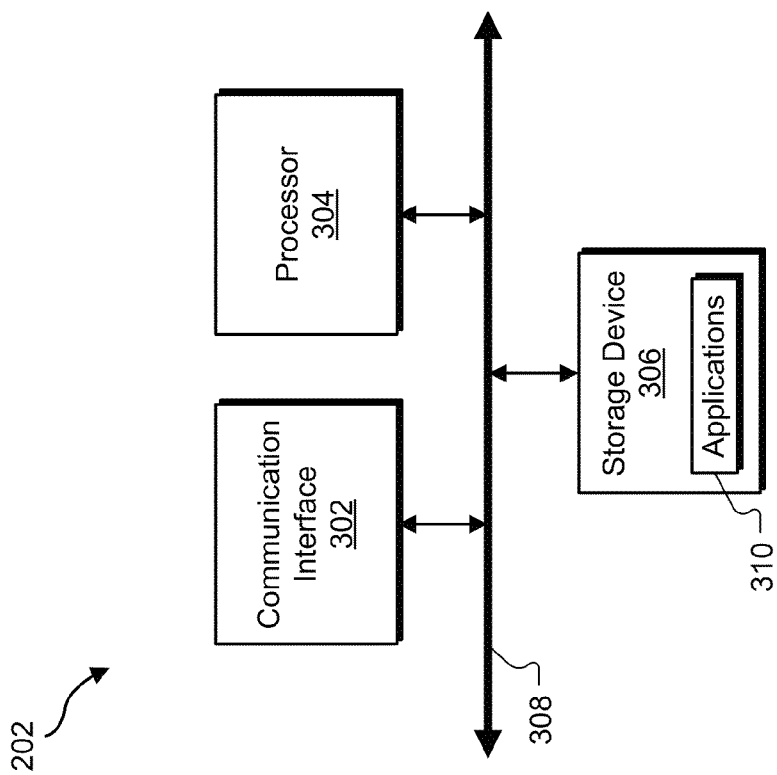
FIG. 3 illustrates exemplary components of a media content delivery subsystem according to principles described herein.

FIG. 3 illustrates exemplary components of delivery subsystem 202. As shown in FIG. 3, delivery subsystem 202 may include a communication interface 302, a processor 304, and a storage device 306 communicatively coupled one to another via a communication infrastructure 308. The components of delivery subsystem 202 may communicate with one another, including sending data to and receiving data from one another, using any suitable communication technologies. Moreover, the components of delivery subsystem 202 may be implemented on any computing device or combination of computing devices, such as one or more servers, personal computers, or the like.

While an exemplary delivery subsystem 202 is shown in FIG. 3, the components illustrated in FIG. 3 are not intended to be limiting. Additional or alternative components may be used in other embodiments. Components of the delivery subsystem 202 shown in FIG. 3 will now be described in additional detail.

Communication interface 302 may be configured to communicate with one or more computing devices, including access subsystem 204. In particular, communication interface 302 may be configured to transmit and/or receive communication signals, media content, and/or data to/from access subsystem 204. Examples of communication interface 302 include, without limitation, a wired network interface (such as a network interface card), a wireless network interface (such as a wireless network interface card), a modem, and any other suitable interface.

In some examples, communication interface 302 may be configured to transmit (e.g., broadcast, multicast, and/or narrowcast) data representative of one or more media content programs to access subsystem 204. Such data may be transmitted in one or more media content streams, as one or more data files, via one or more media content channels, or in any other suitable manner as may serve a particular application. Communication interface 302 may be configured to interface with any suitable communication media, protocols, and formats, including any of those mentioned above.

Processor 304 generally represents any type or form of processing unit capable of processing data or interpreting, executing, and/or directing execution of one or more of the instructions, processes, and/or operations described herein. Processor 304 may direct execution of operations in accordance with one or more applications 310 or other computer-executable instructions such as may be stored in storage device 306 or another computer-readable medium. As an example, processor 304 may be configured to process data, including modulating, encoding, and/or otherwise preparing data (e.g., media content data) for transmission by communication interface 302.

Storage device 306 may include one or more data storage media, devices, or configurations and may employ any type, form, and combination of data storage media and/or device. For example, storage device 306 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 306. For example, data representative of one or more executable applications 310 configured to direct processor 304 to perform any of the operations described herein may be stored within storage device 306. In some examples, data may be arranged in one or more databases residing within storage device 306.

In some examples, media content access facility 102, channel guide facility 104, advertisement facility 106, user interface facility 108, interactive portal access facility 110, and/or storage facility 112 may be implemented by or within one or more components of delivery subsystem 202. For example, one or more applications 310 residing within storage device 306 may be configured to direct processor 304 to perform one or more processes or functions associated with media content access facility 102, channel guide facility 104, advertisement facility 106, user interface facility 108, and/or interactive portal access facility 110. Likewise, storage facility 112 may be implemented by or within storage device 306. For example, channel data 114, advertisement data 116, and/or user profile data 118 may be stored within storage device 306.

Figure 4:
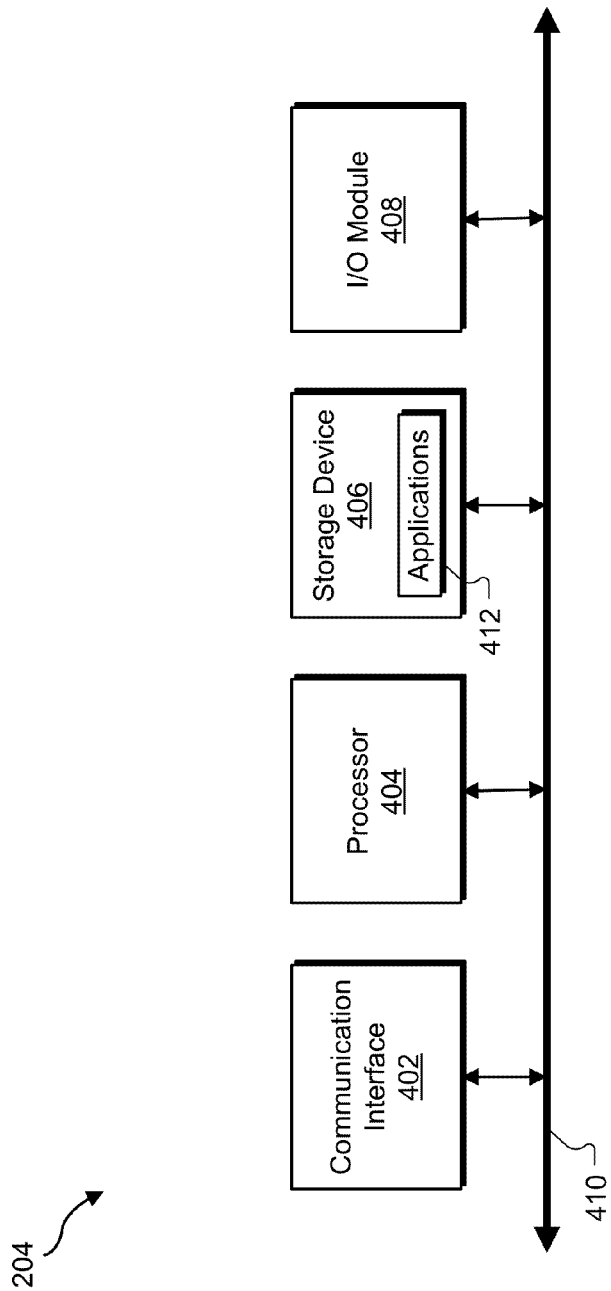
FIG. 4 illustrates exemplary components of a media content access subsystem according to principles described herein.

FIG. 4 illustrates exemplary components of access subsystem 204. As shown in FIG. 4, access subsystem 204 may include a communication interface 402, a processor 404, a storage device 406, and an input/output ("I/O") module 408 communicatively coupled one to another via a communication infrastructure 410. The components of access subsystem 204 may communicate with one another, including sending data to and receiving data from one another, using any suitable communication technologies. Moreover, the components of access subsystem 204 may be implemented on any computing device or combination of computing devices, such as a set-top box, a communications device, a mobile device (e.g., a mobile phone device), a handheld device, a personal computer, a phone device (e.g., Verizon Hub device), a personal-digital assistant device, gaming device, a DVR device, a television device, a media player device, and/or any media content access device configured to perform one or more of the processes and/or operations described herein.

While an exemplary access subsystem 204 is shown in FIG. 4, the components illustrated in FIG. 4 are not intended to be limiting. Additional or alternative components may be used in other embodiments. Components of the access subsystem 204 shown in FIG. 4 will now be described in additional detail.

Communication interface 402 may be configured to communicate with one or more computing devices, including delivery subsystem 202. In particular, communication interface 402 may be configured to transmit and/or receive communication signals, media content, and/or data to/from delivery subsystem 202. Examples of communication interface 402 include, without limitation, a wired network interface (such as a network interface card), a wireless network interface (such as a wireless network interface card), a modem, and any other suitable interface.

As mentioned, delivery subsystem 202 may transmit (e.g., broadcast, multicast, and/or narrowcast) data representative of one or more media content programs. Communication interface 402 may be configured to receive such data such that the data may be processed by access subsystem 204. To this end, communication interface 402 may include any device, logic, and/or other technologies suitable for receiving signals, data streams, and/or data representative of media content. Communication interface 402 may be configured to interface with any suitable communication media, protocols, and formats, including any of those mentioned above.

In certain embodiments, delivery subsystem 202 may be configured to transmit and access subsystem 204 may be configured to receive data streams or signals including data representative of various media content programs in accordance with a transmission schedule. The transmission schedule may specify that particular media content programs are to be transmitted at scheduled transmission times and on certain media content channels. As used herein, the term "scheduled transmission time" or "scheduled transmission" may refer generally to any period of time during which a media content program is to be transmitted to access subsystem 204.

Communication interface 402 may be configured to selectively identify, receive, and/or process appropriate data streams and/or media content programs at the scheduled transmission times and on the appropriate media content channels. For instance, in certain implementations communication interface 402 may include a tuner configured to selectively receive media content carried on a particular media content channel. The tuner may be tuned to a particular media content channel such that the media content carried on the media content channel is received and may be processed by access subsystem 204.

In some examples, communication interface 402 may include multiple tuners such that media content carried on different media content channels may be concurrently received for processing by the access subsystem 204. For example, communication interface 402 may include a first tuner configured to receive media content carried on an analog video signal and a second tuner configured to concurrently receive media content carried on a digital compressed signal.

While one or more tuners may be used to receive various types of media content-carrying signals transmitted by delivery subsystem 202, additionally or alternatively, communication interface 402 may be configured to receive other types of signals (e.g., other types of media content carrying signals) from delivery subsystem 202 and/or one or more other sources without using a tuner. For example, delivery subsystem 202 may transmit digital streams of data packets (e.g., Internet Protocol ("IP") based data packets) that can be received without using a tuner. For such types of signals, communication interface 402 may receive and forward the signals directly to other components of access subsystem 204 without the signals going through a tuner. For an IP-based signal, for example, communication interface 402 may function as an IP receiver.

Processor 404 generally represents any type or form of processing unit capable of processing data or interpreting, executing, and/or directing execution of one or more of the instructions, processes, and/or operations described herein. Processor 404 may direct execution of operations in accordance with one or more applications 412 or other computer-executable instructions such as may be stored in storage device 406 or another computer-readable medium. As an example, processor 404 may be configured to process data, including demodulating, decoding, and/or parsing data (e.g., data representative of media content received from delivery subsystem 202 by communication interface 402), and encoding and modulating data for transmission by communication interface 402.

Storage device 406 may include one or more data storage media, devices, or configurations and may employ any type, form, and combination of data storage media and/or device. For example, storage device 406 may include, but is not limited to, a hard drive, network drive, flash drive, magnetic disc, optical disc, RAM, DRAM, other non-volatile and/or volatile data storage units, or a combination or sub-combination thereof. Electronic data, including data described herein, may be temporarily and/or permanently stored in storage device 406. For example, data representative of one or more executable applications 412 configured to direct processor 404 to perform any of the operations described herein may be stored within storage device 406. In some examples, data may be arranged in one or more databases residing within storage device 406.

I/O module 408 may be configured to receive user input and provide user output and may include any hardware, firmware, software, or combination thereof supportive of input and output capabilities. For example, I/O module 408 may include one or more devices for capturing user input, including, but not limited to, a microphone, speech recognition technologies, keyboard or keypad, touch screen component (e.g., touch screen display), receiver (e.g., an RF or infrared receiver), and one or more input buttons.

I/O module 408 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 408 is configured to provide graphical data to a display for presentation to a user. The graphical data may be representative of one or more GUIs, GUI views, media content views, channel guide views, and/or any other view as may serve a particular application.

In some examples, media content access facility 102, channel guide facility 104, advertisement facility 106, user interface facility 108, interactive portal access facility 110, and/or storage facility 112 may be implemented by or within one or more components of access subsystem 204. For example, one or more applications 412 residing within storage device 406 may be configured to direct processor 404 to perform one or more processes or functions associated with media content access facility 102, channel guide facility 104, advertisement facility 106, user interface facility 108, and/or interactive portal access facility 110. Likewise, storage facility 112 may be implemented by or within storage device 406. For example, channel data 114, advertisement data 116 and/or user profile data 118 may be stored within storage device 406.

Figure 5:
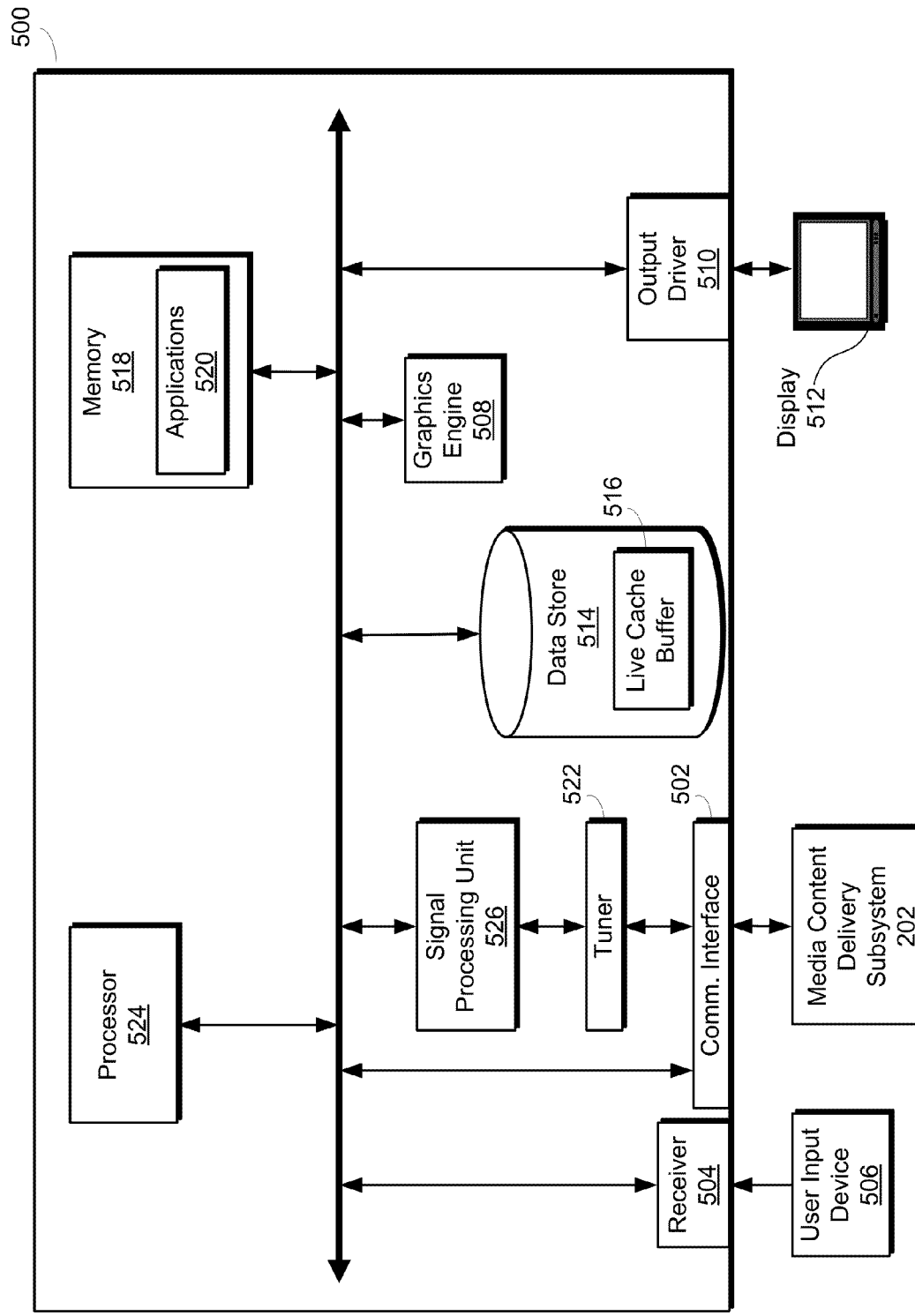
FIG. 5 illustrates an exemplary media content access device having the media content access subsystem of FIG. 4 implemented thereon according to principles described herein.

Access subsystem 204 and/or components of access subsystem 204 may be implemented as may suit a particular application. FIG. 5 illustrates an exemplary media content access device 500 (or simply "device 500") having access subsystem 204 implemented thereon. Device 500 may include one or more of the components of access subsystem 204 shown in FIG. 4 and may be configured to perform one or more of the processes and/or operations described herein. Device 500 may include, but is not limited to, a set-top box, a media content processing device, a communications device, a mobile device (e.g., a mobile phone device), a handheld device, a personal computer, a phone device (e.g., Verizon Hub device), a personal-digital assistant device, a gaming device, a DVR device, a television device, a media player device, and/or any device configured to perform one or more of the processes and/or operations described herein.

As shown in FIG. 5, device 500 may include a communication interface 502 configured to receive media content (e.g., media content) and/or data (e.g., metadata, program guide data, and/or any other data associated with media content) in any acceptable format from delivery subsystem 202 or from any other suitable external source. Communication interface 502 may include any device, logic, and/or other technologies suitable for receiving signals and/or data representative of media content and/or other types of media content or data. Communication interface 502 may be configured to interface with any suitable communication media, protocols, and formats, including any of those mentioned above.

Device 500 may also include a receiver 504 configured to receive user input signals from a user input device 506. User input device 506 may include, for example, a remote control device or any other suitable input device and may be configured to communicate with receiver 504 via a wireless link (e.g., by infrared signaling), electrical connection, or any other suitable communication link.

Figure 6:
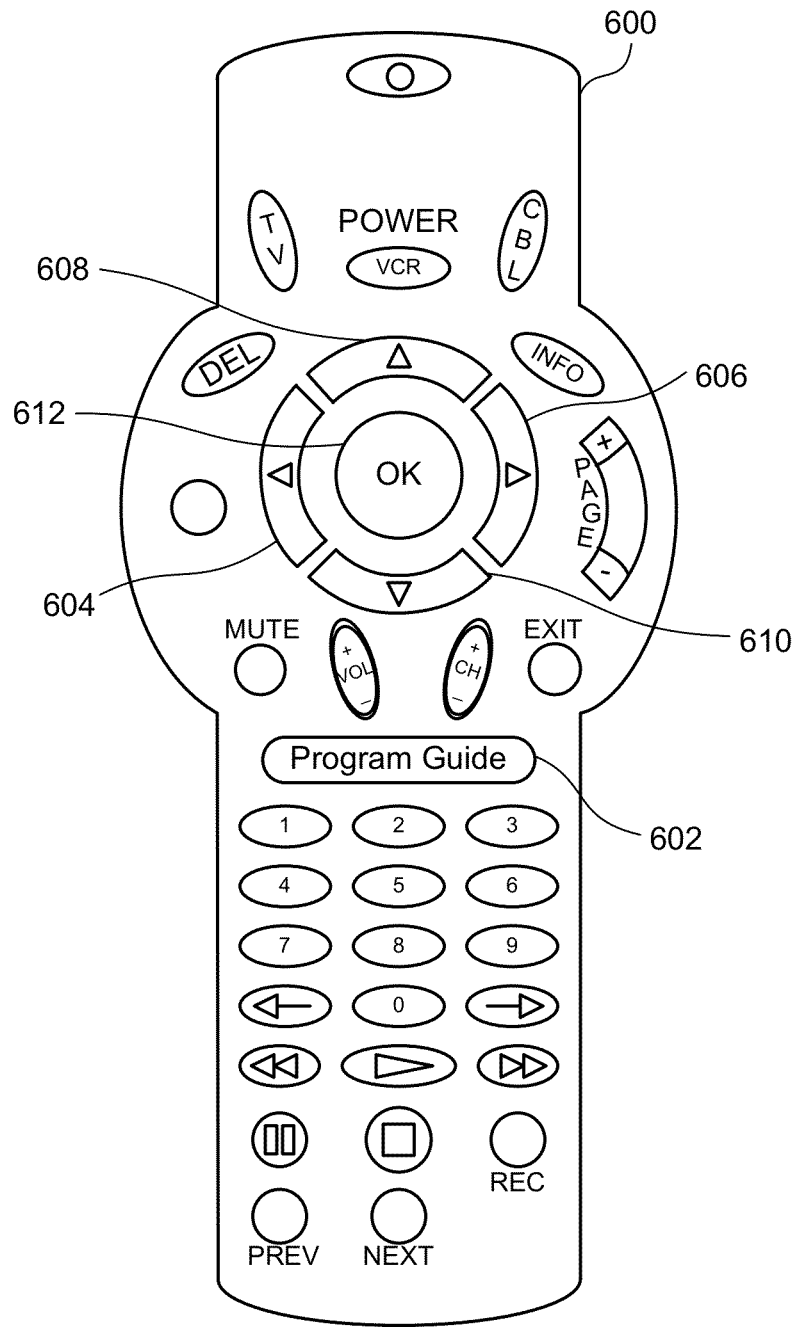
FIG. 6 illustrates an exemplary remote control user input device according to principles described herein.

FIG. 6 illustrates an exemplary remote control device 600 that may implement user input device 506. In some examples, remote control device 600 may be configured to facilitate a user controlling operations of access subsystem 204. For instance, a program guide button 602 may be configured to evoke a presentation of a program guide GUI on a display. A left button 604, a right button 606, an up button 608, a down button 610, and a select button 612 ("OK" button 612) may be included and configured to facilitate a user evoking and/or navigating through various views, options, and GUIs displayed by a display. Remote control device 600 is merely illustrative of one of the many different types of user input devices that may be used to provide input commands (e.g., channel guide browsing commands) to access subsystem 204.

Returning to FIG. 5, device 500 may include a graphics engine 508 and an output driver 510. Graphics engine 508 may be configured to generate graphics to be provided to output driver 510, which may be configured to interface with or drive a display 512. Output driver 510 may provide output signals to display 512, the output signals including graphical content (e.g., media content, program guide media content, user interfaces, and/or advertisement views) generated by graphics engine 508 and to be presented by display 512 for experiencing by a user. Graphics engine 508 and output driver 510 may include any combination of hardware, software, and/or firmware as may serve a particular application.

Data store 514 may include one or more data storage media, devices, or configurations and may employ any type, form, and combination of storage media. For example, data store 514 may include, but is not limited to, a hard drive, network drive, flash drive, magnetic disc, optical disc, or other non-volatile storage unit. Media content and/or data associated with media content may be temporarily and/or permanently stored in data store 514.

Data store 514 is shown to be included within device 500 in FIG. 5 for illustrative purposes only. It will be understood that data store 514 may additionally or alternatively be located external to device 500.

Data store 514 may include one or more live cache buffers 516. Live cache buffer 516 may additionally or alternatively reside in memory 518 or in a storage device external to device 500. In some examples, media content data may be temporarily stored in live cache buffer 516 to facilitate recording of media content and/or presentation of media content in one or more trick play modes.

Device 500 may include memory 518. Memory 518 may include, but is not limited to, FLASH memory, RAM, DRAM, other suitable computer-readable media, or any combination or sub-combination thereof. In some examples, one or more applications 520 configured to run on or otherwise be executed by device 500 may reside in memory 518.

Device 500 may include one or more tuners 522. Tuner 522 may be configured to selectively receive media content carried on a particular media content channel such that the media content may be processed by device 500. In some examples, media content received by tuner 522 may be temporarily buffered, or stored, in the live cache buffer 516. If there are multiple tuners 522, there may be a live cache buffer 516 corresponding to each of the tuners 522.

While tuner 522 may be used to receive certain media content-carrying signals transmitted by delivery subsystem 202, device 500 may be configured to receive other types of content signals (including media content signals and/or program guide data signals) from delivery subsystem 202 and/or one or more other sources without using a tuner. For example, delivery subsystem 202 may transmit digital streams of data packets (e.g., Internet Protocol ("IP") based data packets) that can be received without using a tuner. For such types of content signals, communication interface 502 may receive and forward the signals directly to other components of device 500 (e.g., processor 524 or signal processing unit 526, described in more detail below) without the signals going through tuner 522. For an IP-based signal, for example, signal processing unit 526 may function as an IP receiver.

Device 500 may include at least one processor, such as processor 524, configured to control and/or perform one or more operations of device 500. Device 500 may also include a signal processing unit 526 configured to process incoming media content. Signal processing unit 526 may be configured, for example, to demodulate and parse encoded digital media content. In some examples, device 500 may include one or more signal processing units 526 corresponding to each of the tuners 522.

As mentioned, system 100 may generate and launch a GUI for display to a user. Exemplary views of GUIs that may be provided by system 100 for display will now be described in more detail in reference to FIGS. 7-18.

Figure 7:
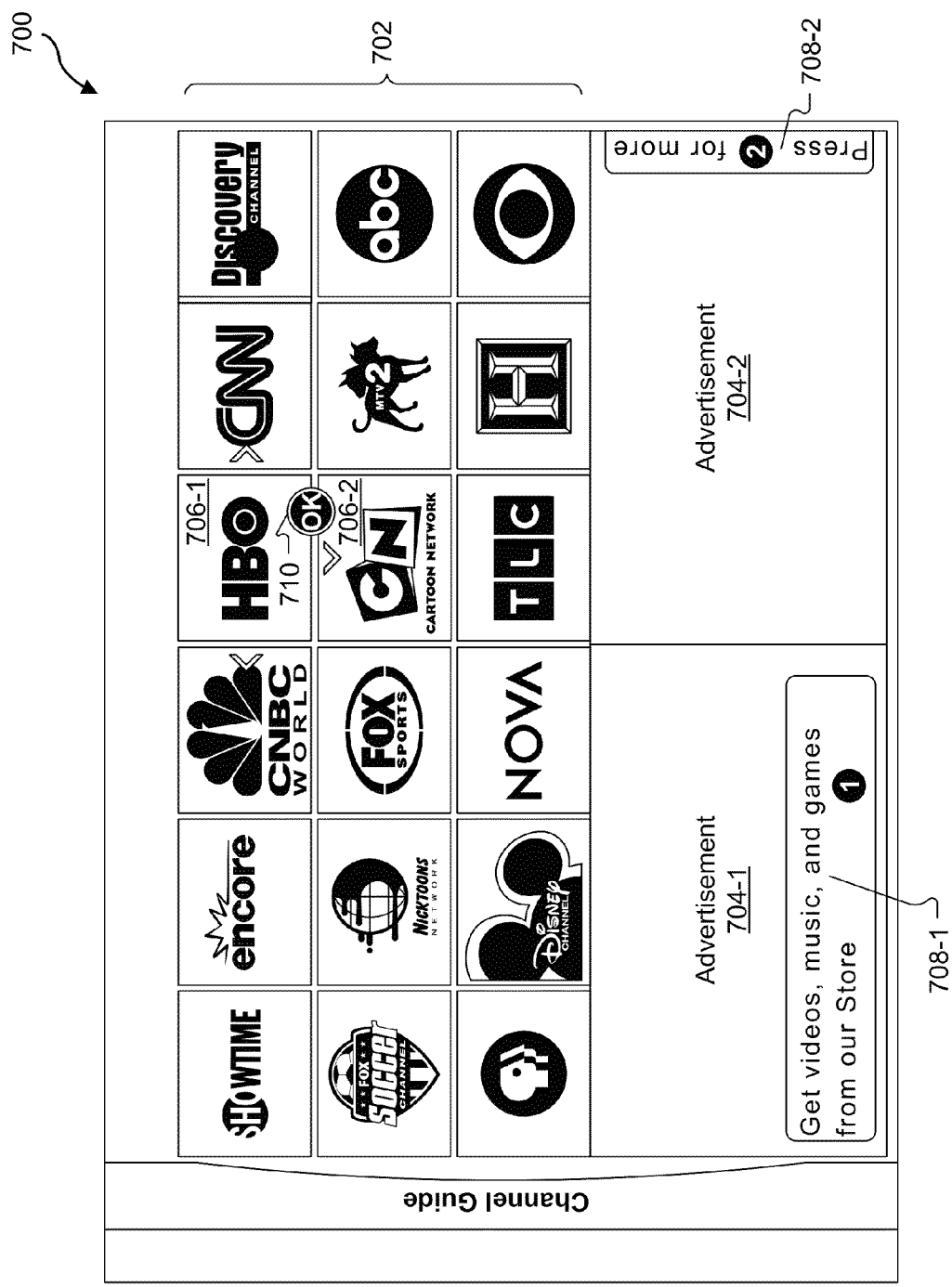
FIGS. 7-18 illustrate exemplary views of graphical user interfaces that may be displayed on a display screen according to principles described herein.

FIG. 7 illustrates an exemplary view of a channel guide GUI 700 (or simply "GUI 700"). GUI 700 may include a graphical representation of a channel guide 702 and one or more graphical representations of one or more advertisements 704 (e.g., advertisements 704-1 and 704-2) displayed together with channel guide 702 in GUI 700. As shown in FIG. 7, channel guide 702 may include a two-dimensional grid matrix view of a plurality of channel icons, which are associated with a plurality of media content channels. For example, channel icon 706-1 is associated with a media content channel known as "CNN," and channel icon 706-2 is associated with a media content channel known as "Cartoon Network." In FIG. 7, channel icons are arranged by rows and columns to form the two-dimensional grid matrix view.

In addition to being associated with a media content channel, each channel icon in channel guide 702 may be associated with and configured to function as a launching point for an interactive portal associated with the corresponding media content channel. Accordingly, a user selection of a channel icon in channel guide 702 may cause system 100 to access an interactive portal associated with the selected channel icon.

As an example, when a user provides input indicating a selection of channel icon 706-1 associated with the HBO media content channel, system 100 may detect the selection and access an interactive portal associated with the "HBO" media content channel. One or more GUIs associated with the interactive portal may be displayed to the user. The interactive portal and/or GUIs associated with the interactive portal may include any of the content disclosed above, including content that is controlled by the media content provider providing content for distribution via the HBO media content channel.

Advertisements 704 displayed together with channel guide 702 in GUI 700 may include any of the advertisement content described above. In certain examples, advertisements 704 may be personalized to a user as described above. In certain embodiments, system 100 may be configured to automatically select and insert one or more advertisements 704 in GUI 700 when the GUI 700 is launched. Accordingly, when a user provides user input configured to trigger a launch of GUI 700, upon launch of GUI 700 the user may be provided with and able to view advertisements 704 displayed together with channel guide 702 in GUI 700.

As shown in FIG. 7, GUI 700 may include one or more visual prompts 708 (e.g., visual prompts 708-1 and 708-2), which may be associated with advertisements 704 and/or with a virtual store through which products and/or services may be acquired by a user. As an example, visual prompt 708-1 may be configured to inform a user of a specific input that may be provided by the user to access a virtual store through which products and/or services may be acquired by a user. In FIG. 7, the specific input configured to initiate access to the virtual store comprises a specific button on a user input device such as remote control device 600 (e.g., a button labeled "1" on remote control device 600). The virtual store may include one or more tools that may be utilized by the user to acquire (e.g., purchase, rent, subscribe to) media content such as videos, music, and games, or to acquire any other product or service offered in the virtual store. Exemplary GUI views that are related to a purchase of a media content program in a virtual store are described further below.

Figure 8:
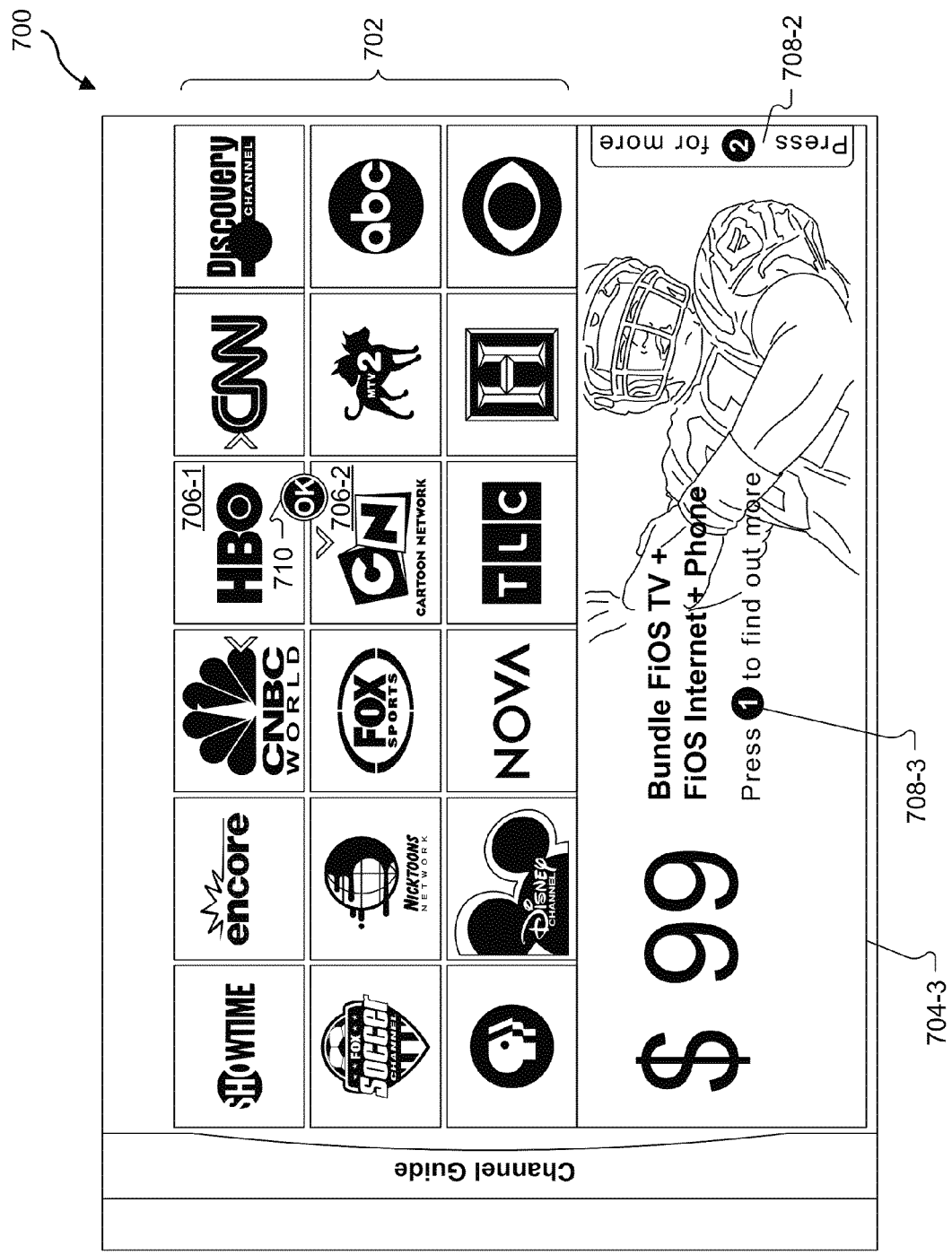

As another example, visual prompt 708-2 may be configured to inform a user of a specific input that may be provided by the user to access more advertisements 704. In FIG. 7, the specific input configured to initiate access to additional advertisements 704 comprises a specific button on a user input device such as remote control device 600 (e.g., a button labeled "2" on remote control device 600). In response to a user selection of the specific button, system 100 may display additional advertisements 704 in GUI 700. This may include scrolling a strip of advertisements 704 such that one or more of the currently displayed advertisements 704 is moved off-screen out of the display view and one or more other advertisements 704 is moved on-screen within the display view. FIG. 8 illustrates GUI 700 with a different advertisement 704-3 displayed together with channel guide 702 in GUI 700. As shown, advertisement 704-3 is configured to promote a bundled service subscription offering (e.g., a bundled subscription package including television, internet access, and telephone subscriber services). A visual prompt 708-3 is also displayed in conjunction with advertisement 704-3. As shown, visual prompt 708-3 may be configured to inform a user of a specific input that may be provided by the user to access more information about the offer specified by advertisement 704-3. In FIG. 8, the specific input configured to initiate access to more information related to advertisement 704-3 comprises a specific button on a user input device such as remote control device 600 (e.g., a button labeled "1" on remote control device 600).

Figure 9:
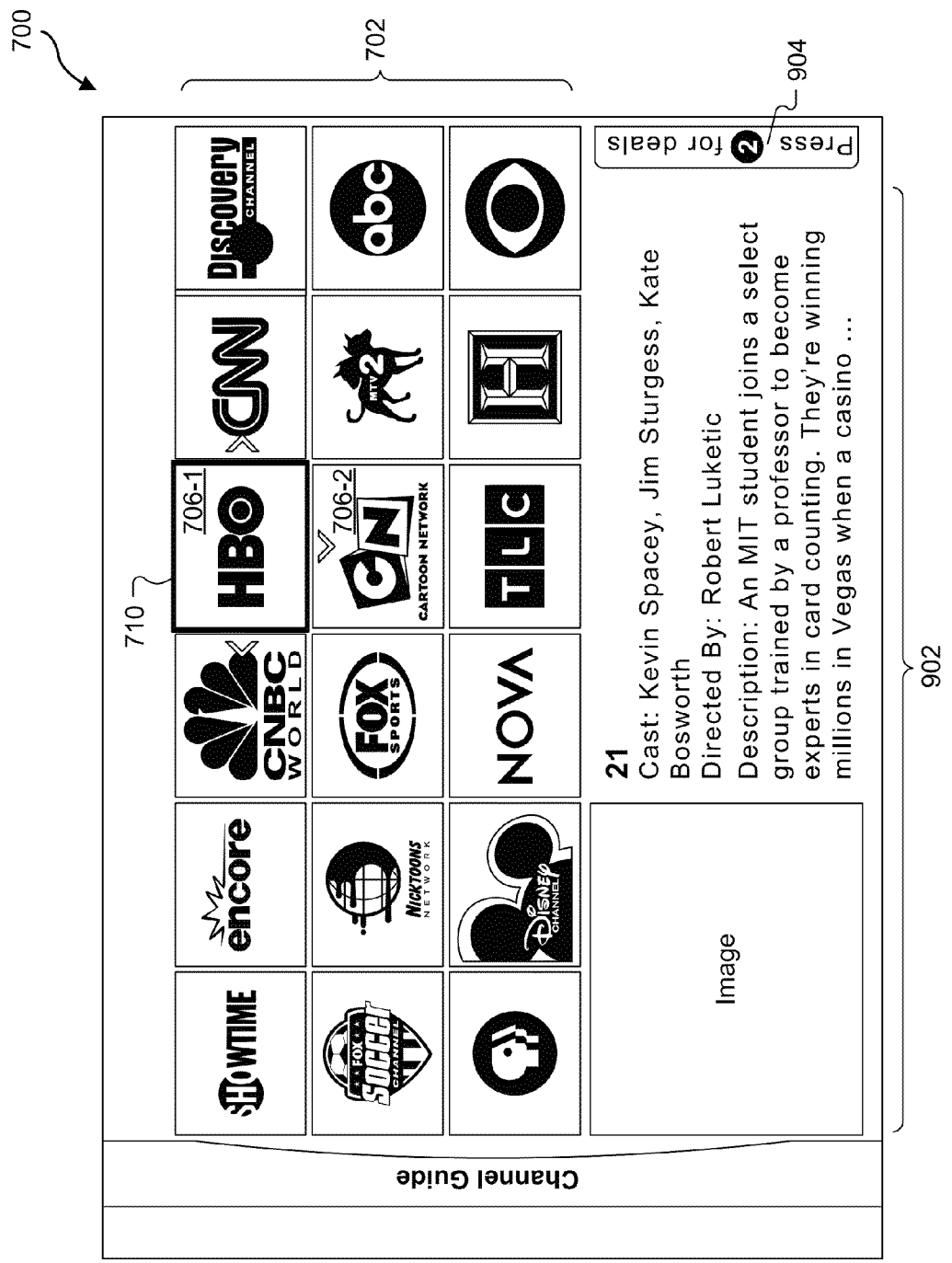

In certain embodiments, the advertisement content shown in FIGS. 8 and 9 may represent advertisement content that may be displayed in GUI 700 during operation in a "launch mode," which may be the mode of operation associated with GUI 700 immediately following a launch of GUI 700 for display. In "launch mode," a first category of advertisement content may be displayed together with channel guide 702 in GUI 700. In certain examples, the first category of content may include advertisements that are selected from a general pool of advertisements without restriction to advertisements that are specific to a particular media content channel. In some examples, the first category of advertisement content may be provided by an entity operating delivery subsystem 202 (e.g., a service carrier).

System 100 may be configure to transition from "launch mode" to another mode of operation in response to an occurrence of a predefined event. For example, system 100 may transition from "launch mode" to a "navigation mode" in response to a user navigation event within channel guide 702. To illustrate, during "launch mode" user navigation input may be received indicating a desire of a user to navigate within channel guide 702. The navigation may include activating a selector within channel guide 702 and/or moving a graphical representation of the selector within channel guide 702. As shown in FIGS. 7 and 8, for example, a graphical representation of a selector 710 may be positioned at channel icon 706-1. Selector 710 may indicate one or more navigational commands that may be input by a user to navigate selector 710 within channel guide 710. In FIGS. 7 and 8, for instance, selector 710 includes directional arrows indicating directions in which selector 710 may be moved in channel guide 702 in response to user input associated with the directional arrows. In the illustrated example, selector 701 may be moved left when left arrow button 604 of remote control device 600 is selected, right when right arrow button 606 of remote control device 600 is selected, and down when down arrow button 610 of remote control device 600 is selected.

In certain embodiments, selector 710 may be in an inactive state when GUI 700 is operating in "launch mode." In FIGS. 7 and 8, for example, selector 710 is inactive and includes a visual indicator indicating a specific input that may be input by a user to activate selector 710 for navigation within channel guide 702. In the illustrated example, the specific input comprises a specific button on a user input device such as remote control device 600 (e.g., the "OK" button 612 on remote control device 600).

When a user inputs the specific input to activate selector 710, system 100 may activate selector 710 such that it becomes navigable within channel guide 702. In addition, system 100 may detect the activation of selector 710 as an occurrence of a user navigation event within channel guide 702 in GUI 700 and respond by transitioning GUI 700 from operation in "launch mode" to operation in "navigation mode." In "navigation mode," a second category of content may be displayed together with channel guide 702 in GUI 700. In certain examples, the second category of content may include content that is selected from a pool of content that is specific to a particular media content channel, such as information, advertisements, and/or other content specific to the media content channel and/or the media content provider associated with the media content channel. In some examples, the second category of content may be provided by the media content provider providing media content for distribution via the media content channel represented by a channel icon that is selected by selector 710 in channel guide 702.

To illustrate, FIG. 9 illustrates a view of GUI 900 after selector 710 has been activated and operation has been transitioned from "launch mode" to "navigation mode." Selector 710 is now navigable and positioned at channel icon 706-1. Accordingly, content specific to the HBO media content channel associated with channel icon 706-1 has been selected and displayed together with channel guide 702 in GUI 700. In FIG. 9, the content is labeled as channel content 902 and includes information (e.g., an image, cast information, director information, and a description) about a media content program that is or will be accessible via the HBO media content channel. Channel content 902 may include other information and/or content specific to the media content channel associated with the selected channel icon in other embodiments.

In the above-described transition from "launch mode" to "navigation mode" in response to a detection of a user navigation event such as an activation of selector 710 in channel guide 702, advertisements 704 displayed together with channel guide 702 during "launch mode" may be replaced with channel content 902 displayed together with channel guide 702 during "navigation mode." The replacement may be accomplished in any suitable way, including actual replacement of visual content data in rendering GUI 700, overlaying or adjusting layers of visual content in GUI 700, resizing of visual content in GUI 700, and/or any other operations that may effectuate a full or partial and visually discernible replacement of visual content in a display of GUI 700.

As shown in FIG. 9, GUI 700 may include a visual prompt 904 displayed in association with channel content 902. Visual prompt 904 may be configured to inform a user of a specific input that may be provided to initiate access to information about one or more deals associated with the channel content 902, the media content channel corresponding to the selected channel icon 706-1, and/or the media content provider providing content for distribution via the media content channel. For example, the deals may include, without limitation, deals for purchasing media content and/or service packages from the media content provider. In FIG. 9, the specific input configured to initiate access to information about the deals comprises a specific button on a user input device such as remote control device 600 (e.g., a button labeled "2" on remote control device 600).

In "navigation mode," when a user navigates selector 710 to another channel icon in channel guide 702, channel content 902 may be updated to include content that is specific to the media content channel associated with the newly selected channel icon. For example, when a user navigation event causes selector 710 to be moved from channel icon 706-1 to channel icon 706-2, channel content 902 specific to the HBO media content channel associated with channel icon 706-1 may be replaced with channel content 902 specific to the Cartoon Network media content channel associated with channel icon 706-2.

In "navigation mode," a user may select the "OK" button 612 of remote control device 600, or provide another specified input in other embodiments, to direct system 100 to access an interactive portal associated with the media content channel corresponding to the channel icon selected by selector 710. For example, while selector 710 is at channel icon 706-1 as shown in FIG. 9, the user may select the "OK" button 612 of remote control device 600, and system 100 may respond by accessing the interactive portal for the HBO media content channel associated with channel icon 706-1.

Returning now to FIG. 7, when a user inputs the user input specified by visual prompt 708-1, system 100 may detect the user input and access a virtual store, which may include generating and providing one or more virtual store GUIs for display to the user. FIGS. 10-15 illustrate exemplary views of virtual store GUIs that may be displayed.

Figure 10:
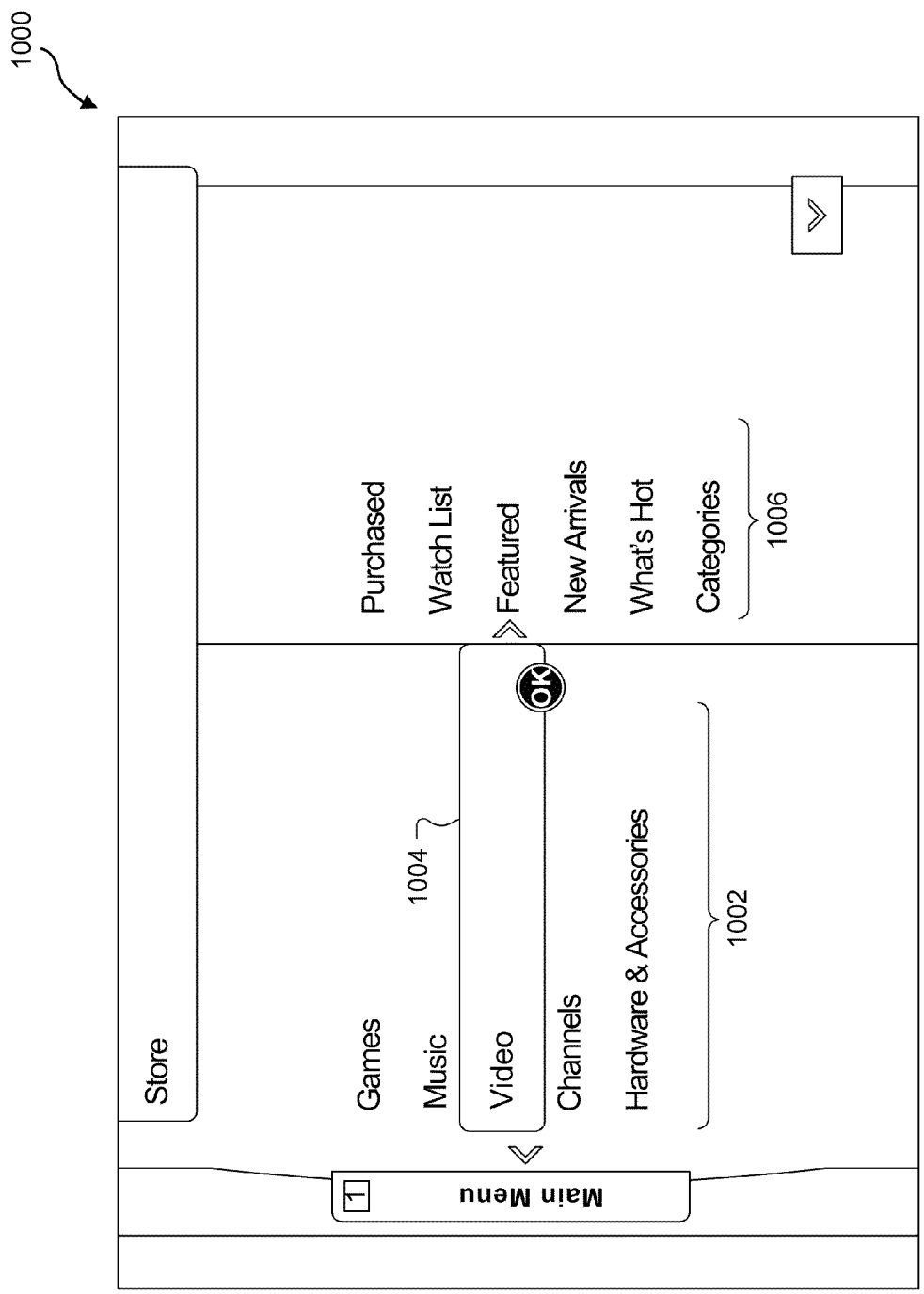

FIG. 10 illustrates an exemplary virtual store GUI 1000 in which a plurality of selectable options are presented to a user. As shown in FIG. 10, the options may be associated with categories of products and/or services that are available for acquisition by the user in the virtual store. As shown, GUI 1000 may include a set of options 1002 that includes a "games" option, a "music" option, a "video" option, a "channels" option, and a "hardware & accessories" option from which the user may select. As shown in FIG. 10, a selector 1004 may be positioned at the "video" option. In response, a set of sub-options 1006 to the "video" option may be displayed in GUI 1000.

Figure 11:
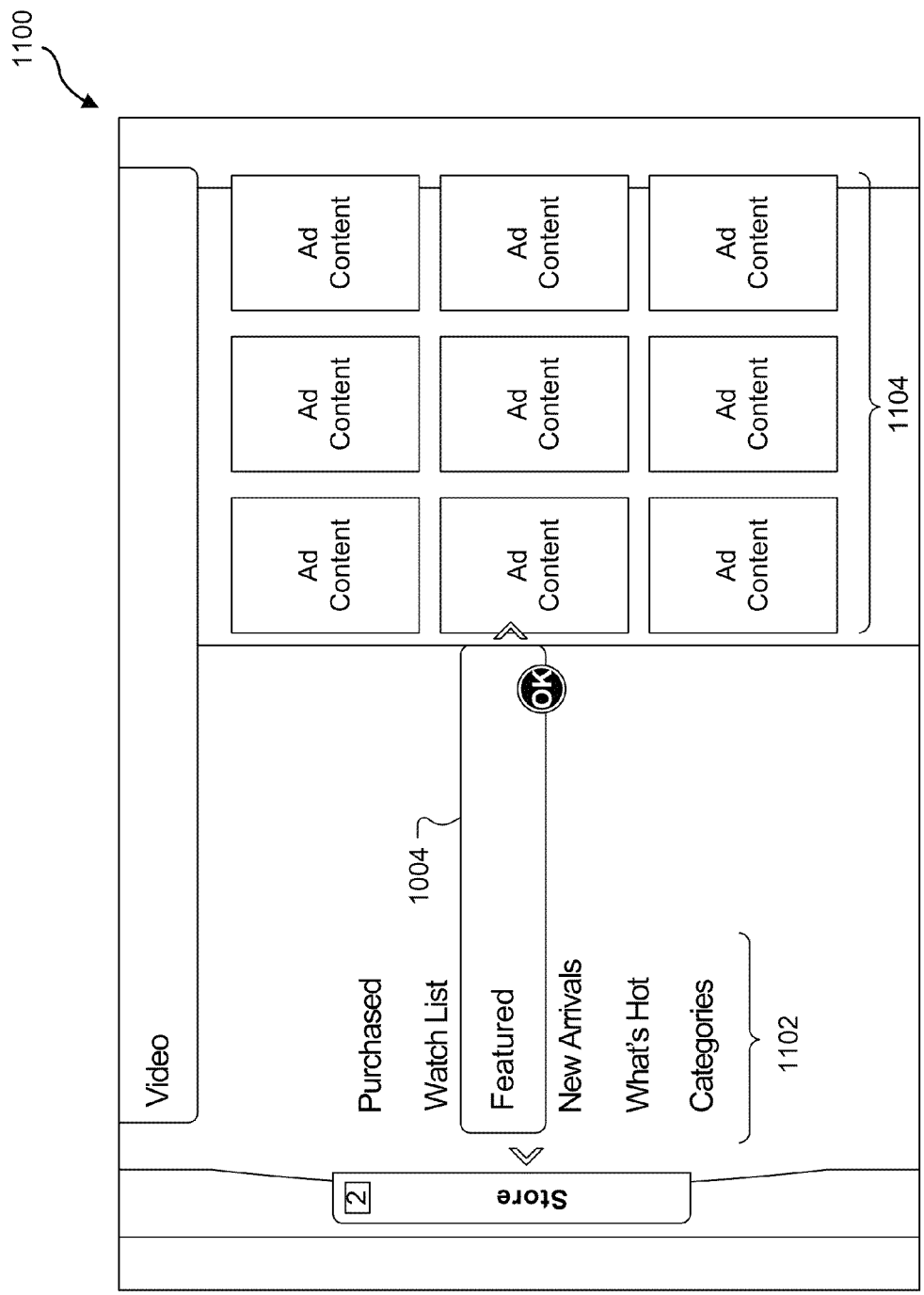

In response to a user selection of the "video" option in FIG. 10, a GUI 1100 shown in FIG. 11 may be displayed. As shown in FIG. 11, GUI 1100 may include a plurality of selectable options 1102, which may include a "purchased" option for accessing videos that have been purchased by the user, a "watch list" option for accessing videos that are included in a user's media content watch list, a "featured" option for accessing "featured" videos, a "new arrivals" option for accessing "new arrival" videos, a "what's hot" option for accessing popular videos, and any "categories" option for accessing videos by category. As shown in FIG. 11, selector 1004 may be positioned at the "featured" option. Accordingly, a set of graphical representations 1104 of featured media content programs such as videos may be displayed in GUI 1100. The graphical representations may include images representative of the videos (e.g., movies).

Figure 12:
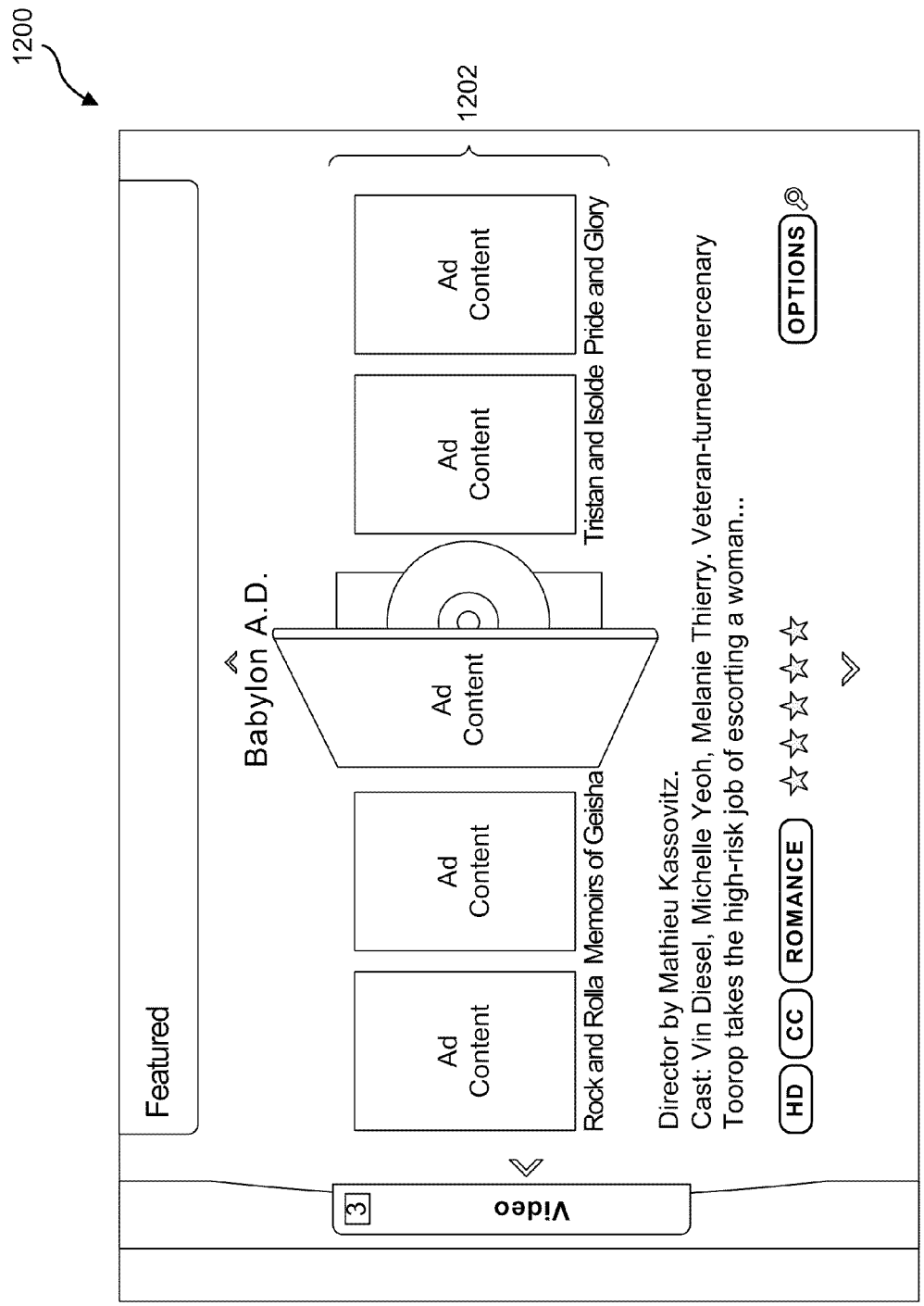

When the "featured" option is selected in FIG. 11, a GUI 1200 shown in FIG. 12 may be displayed. As shown in FIG. 12, GUI 1200 may include graphical representations 1202 of "featured" media content from which a user may select one or more media content programs. In the illustrated example, the graphical representations 1202 of media content depict physical objects associated with videos such as movies. For example, the graphical representations may depict a video disc (e.g., a DVD or Blu-Ray disc), a video disc case (e.g., a DVD or Blu-Ray disc case), and/or any other tangible media on which video content is stored. GUI 1200 may also include graphical representations of information about the featured media content.

Figure 13:
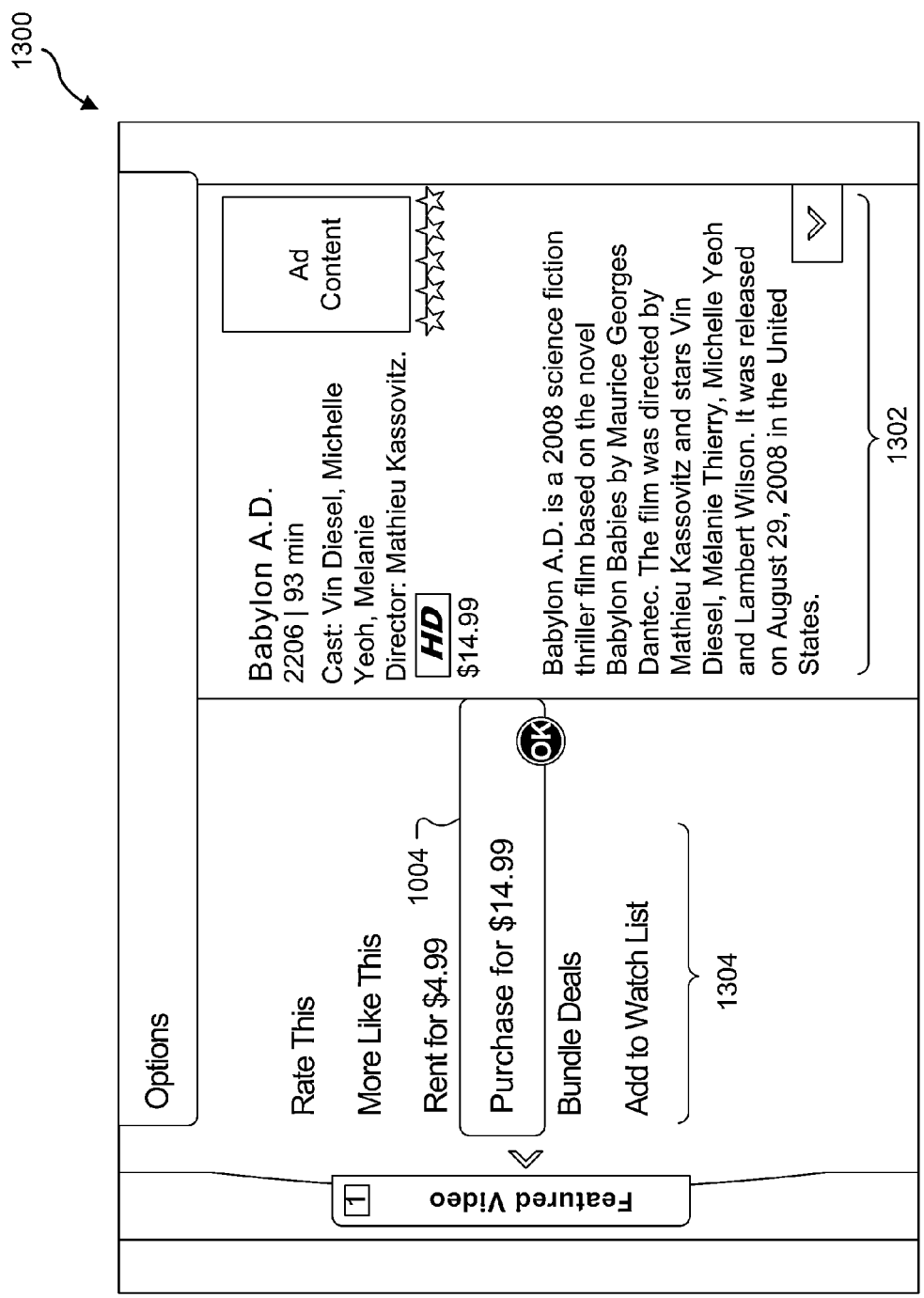

When a media content program represented in FIG. 1200 is selected, GUI 1300 shown in FIG. 13 may be displayed. As shown in FIG. 13, GUI may include additional information 1302 about the selected media content program. In addition, GUI 1300 may include a set of selectable options 1304 associated with the selected media content program. In the illustrated example, the set of options 1304 includes a "rate this" option for providing a rating of the selected media content program, a "more like this" option for accessing information about media content that is similar to the selected media content program, a rental option for renting the media content program, a purchase option for purchasing the media content program, a "bundle deals" option for accessing information about bundle deals that include the media content program and one or more other media content programs, and an "add to watch list" option for adding and selected media content program to a media content watch list.

Figure 14:
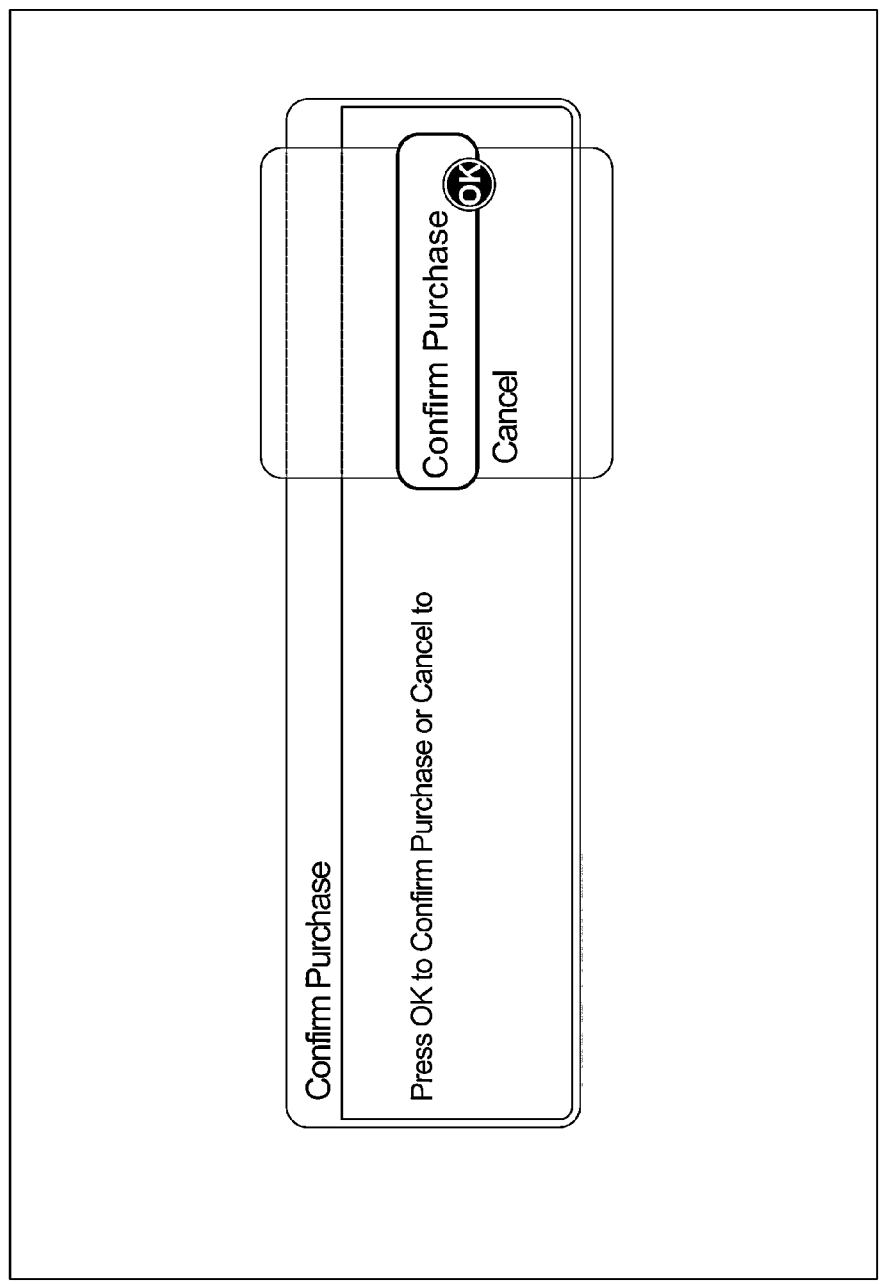

In response to a user selection of the "purchase" option shown in FIG. 13, a GUI 1400 shown in FIG. 14 may be displayed. As shown in FIG. 14, GUI 1400 may be configured to provide the user with an opportunity to confirm a purchase of the selected media content program or to cancel a purchase of the selected media content program.

Figure 15:
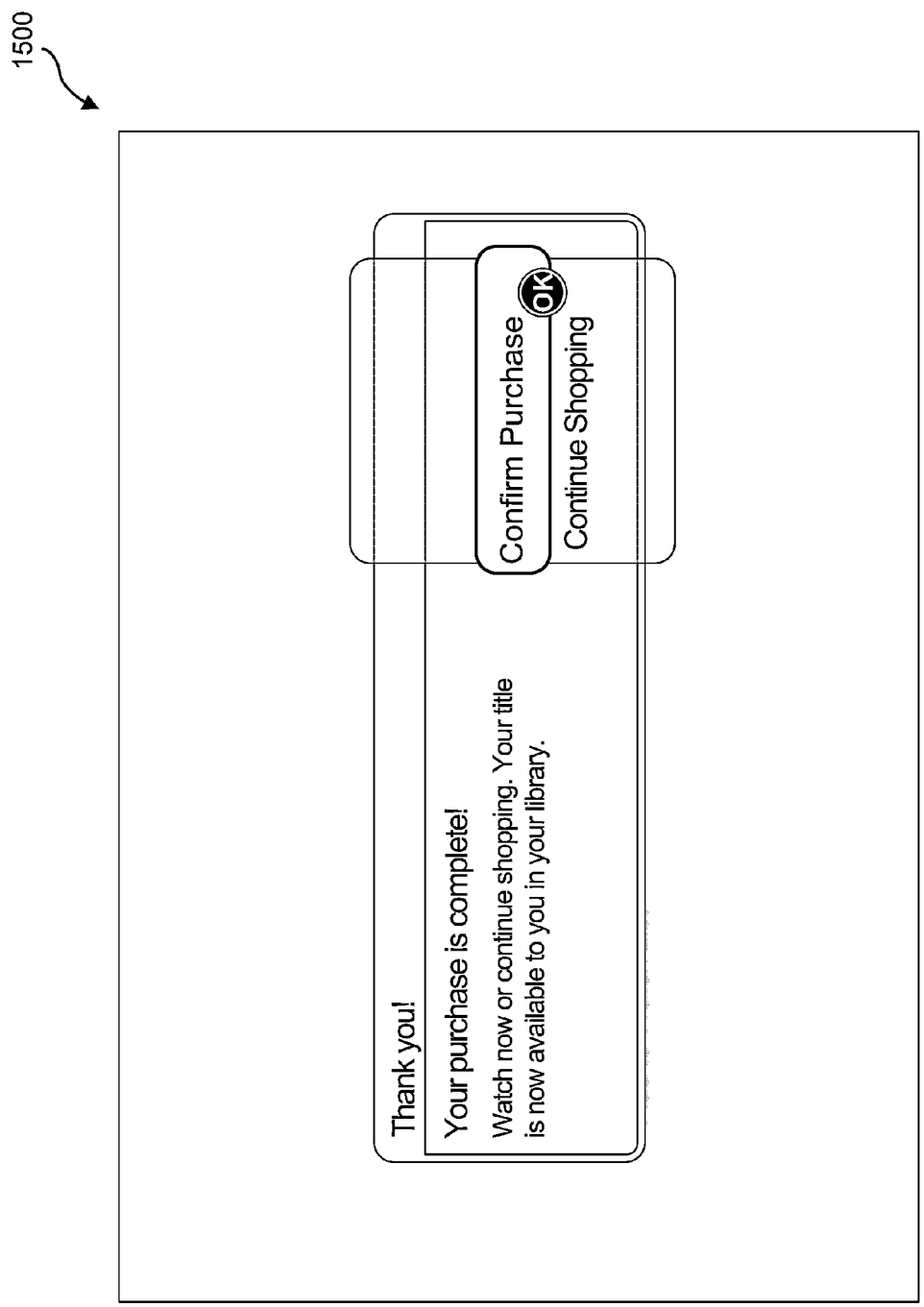

If the user confirms the purchase of the selected media content program in FIG. 14, a GUI 1500 shown in FIG. 15 may be displayed. As shown in FIG. 15, GUI 1500 may provide the user with an opportunity to confirm the purchase of the selected media content program and/or to continue shopping in the virtual store.

The examples of GUIs associated with a virtual store described above are illustrative only. Other virtual store GUIs may be displayed to facilitate user acquisition of one or more products and/or services via the virtual store. The virtual store may be conveniently accessed by the user from a launching point within channel guide GUI 700 as described above or from a launching point within another channel guide GUI.

Figure 16:
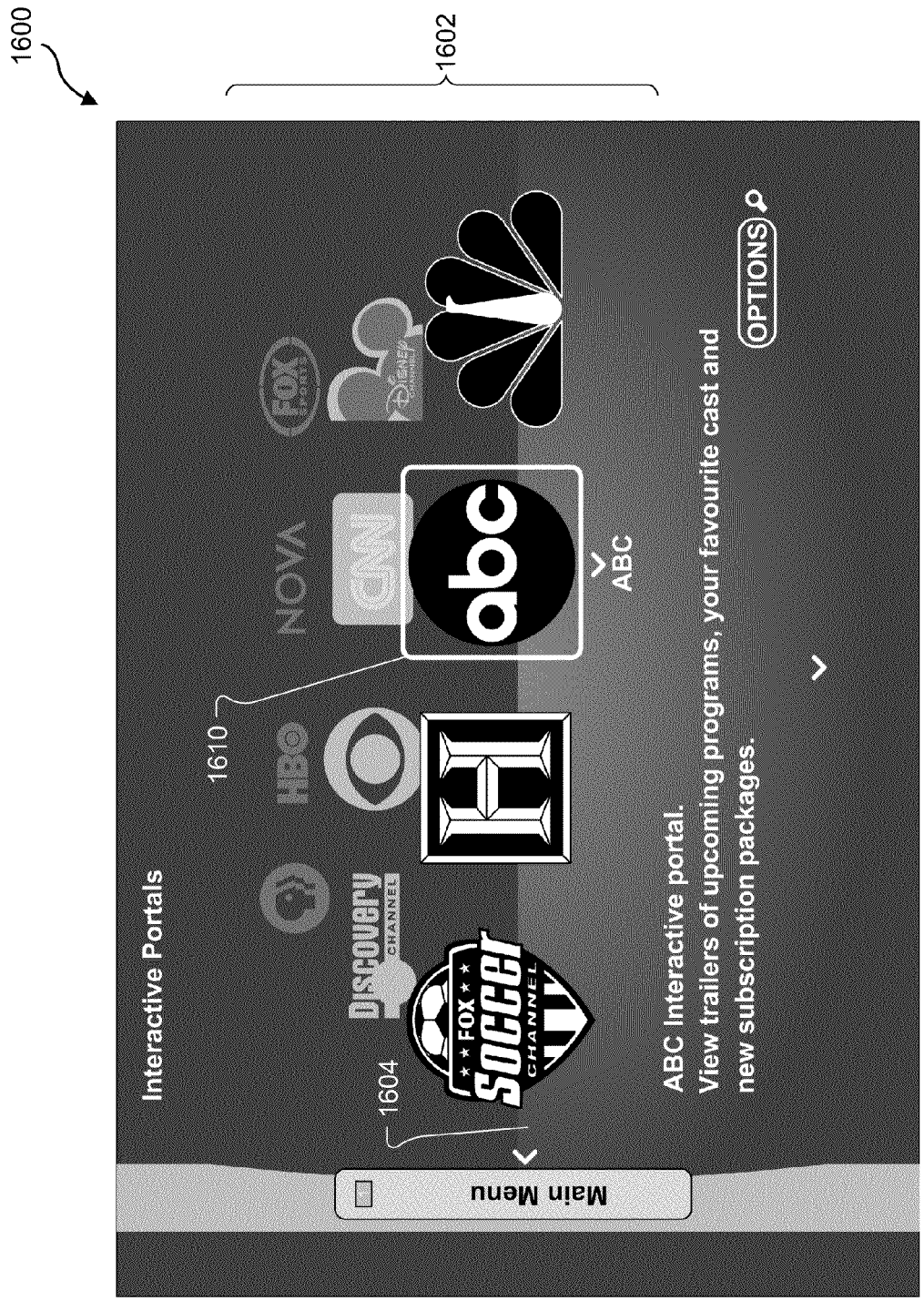

FIG. 16 illustrates another exemplary channel guide GUI 1600 (or simply "GUI 1600") that may be provided for display to a user. As shown in FIG. 16, GUI 1600 may include an exemplary graphical representation of a channel guide 1602 that includes a three-dimensional grid matrix view of a plurality of channel icons associated with a plurality of media content channels. The channel icons may be arranged in the three-dimensional gird matrix in a manner that depicts channel icons at various depths away from a display screen surface. For example, channel icons may be arranged by rows and columns to form the three-dimensional grid matrix view in which the rows are depicted at different depths from the display screen surface. The rows may include generally horizontal rows of channel icons with a foremost horizontal row positioned at a forefront of the three-dimensional grid matrix and one or more other horizontal rows positioned at progressively increasing depths from the forefront of the three-dimensional grid matrix. The horizontal rows of channel icons arranged in the three-dimensional grid matrix may visually taper in width with increased depth from the forefront of the three-dimensional grid matrix.

In certain embodiments, GUI 1600 may further include a graphical representation of a stage 1604 positioned at the forefront of the three-dimensional grid matrix. In FIG. 16, the graphical representation of stage 1604 comprises a graphical representation of a three-dimensional stage or stage surface positioned at the forefront of the three-dimensional grid matrix of channel icons.

As shown in FIG. 16, in certain examples, the first horizontal row of channel icons that is positioned foremost in the three-dimensional grid matrix of channel icons may be positioned and depicted as being "on-stage" (i.e., positioned on stage 1604). The one or more other horizontal rows of channel icons may be positioned and depicted as being "off-stage" (i.e., positioned off of stage 1604).

Figure 17:
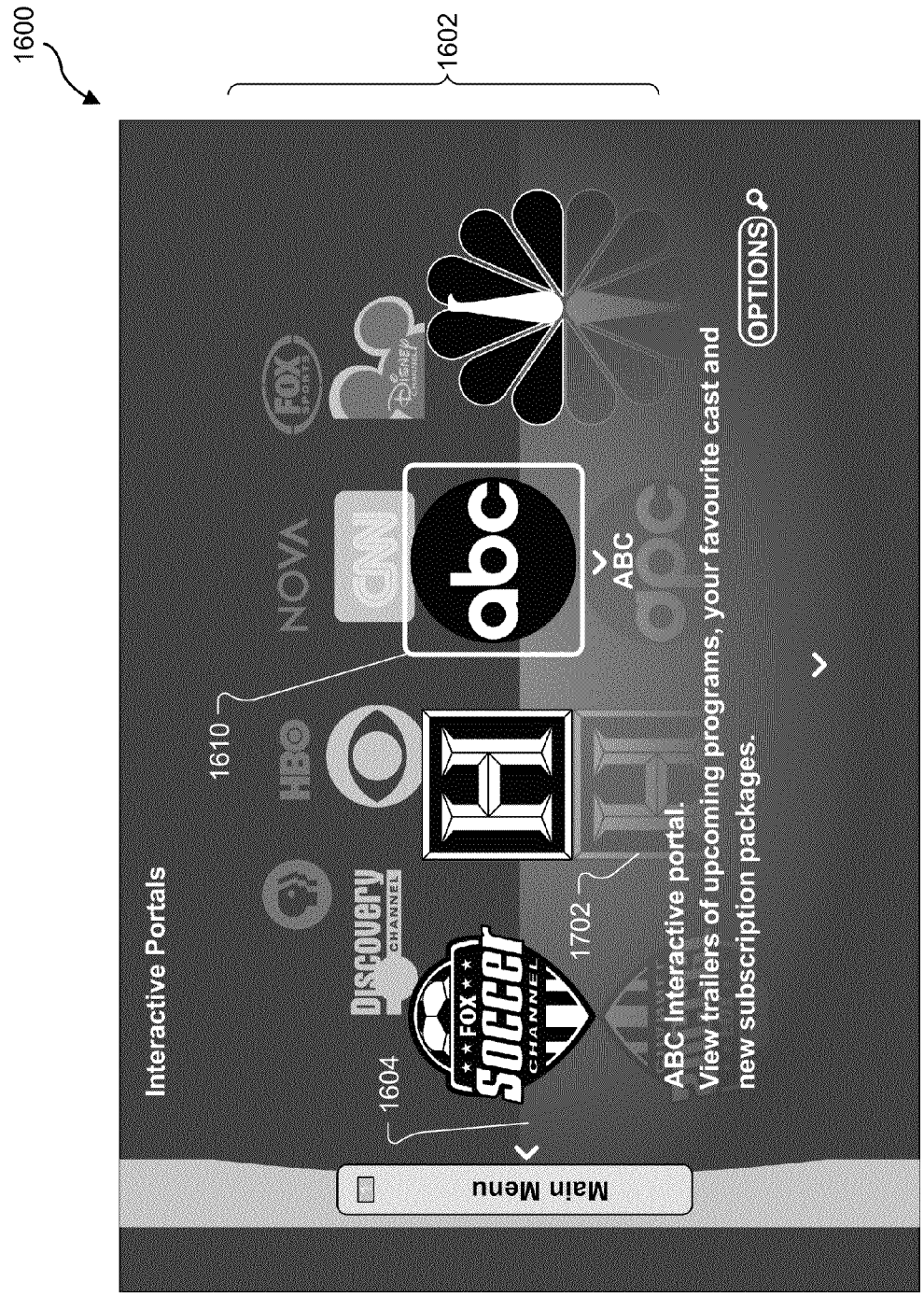

In certain embodiments, GUI 1600 may further include a visual depiction of a spotlight effect on stage 1604. To illustrate, FIG. 17 shows an exemplary view of GUI 1600 with a stage spotlight effect depicted therein. The spotlight effect may be configured to visually accentuate the channel icons positioned on stage 1604 as compared to the channel icons positioned off of stage 1604. For example, the on-stage channel icons may be "spotlighted" by increasing the brightness and/or other visual attribute(s) of the on-stage attributes as compared to the visual attributes of other channel icons positioned off-stage.

In certain examples, GUI 1600 may include one or more graphical representations of one or more reflections of one or more channel icons positioned on-stage. FIG. 17 illustrates exemplary graphical representations of reflections 1702 of the on-stage channel icons. The reflections may help to further accentuate the on-stage channel icons.

In addition to being associated with a media content channel, each channel icon in channel guide 1602 may be associated with and configured to function as a launching point for an interactive portal associated with the corresponding media content channel, as described above. Accordingly, a user selection of a channel icon in channel guide 1602 may cause system 100 to access an interactive portal associated with the selected channel icon. System 100 may detect the user selection of the channel icon and respond by accessing the interactive portal.

GUI 1600 may provide one or more navigation tools that may be utilized by a user to navigation within channel guide 1602. For example, a user may utilize directional arrow buttons of remote control device 600 or other input device to browse from channel icon to channel icon in channel guide 1602. In addition, the user may utilize a selection button of remote control device 600 or other input device to select a channel icon and thereby access an interactive portal associated with the media content channel corresponding to the selected channel icon.

Channel icons may be visually moved within channel guide 1602 in response to a user navigation event in channel guide 1602. To illustrate, FIG. 16 shows a selector 1610 positioned at a channel icon associated with a media content channel known as "ABC." A user may select down arrow button 610 of remote control device 600 to navigate away from the channel icon associated with the "ABC" media content channel. System 100 may detect the user navigation event and respond by directionally scrolling the three-dimensional grid matrix of channel icons relative to stage 1604. For example, each horizontal row of channel icons may be moved away from the display screen in depth-wise direction, the backmost horizontal row of channel icons may be moved out of the display, the second backmost horizontal row of channel icons may replace the backmost horizontal row of channel icons, and so on. The first horizontal row of channel icons positioned at the forefront of the three-dimensional grid matrix may be moved off of state 1604. A new horizontal row of channel icons may be introduced into the display as the foremost horizontal row of channel icons at the forefront of the three-dimensional grid matrix and moved onto stage 1604.

Figure 18:
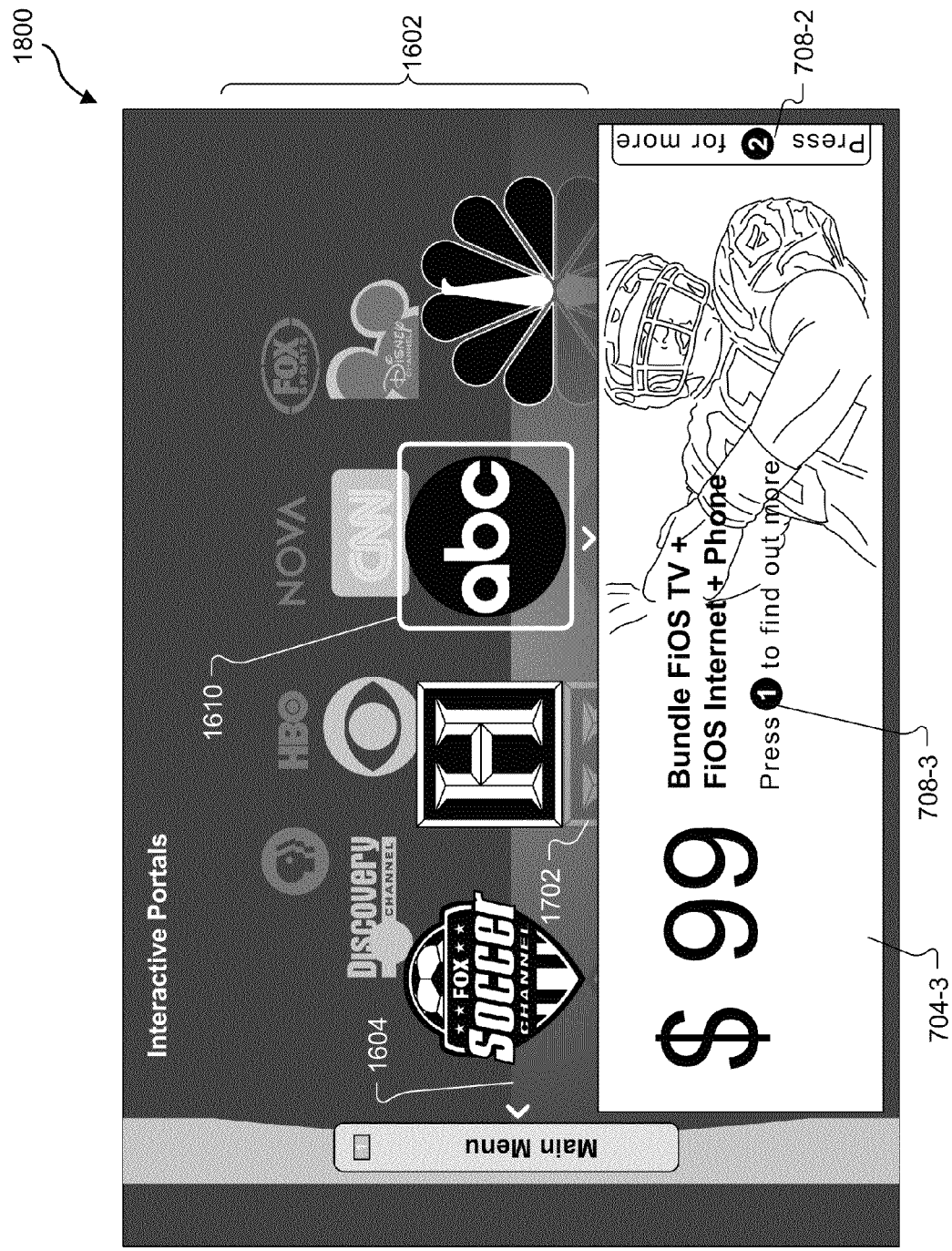

In any of the ways described above in reference to GUI 700, content may be displayed together with channel guide 1602 in a GUI. To illustrate, FIG. 18 shows an exemplary channel guide GUI 1800 (or simply "GUI 1800") that includes a graphical representation of channel guide 1602 and a graphical representation of advertisement 704-3 displayed together with channel guide 1604 in GUI 1800. This is illustrative only. Any advertisement content described herein may be displayed together with channel guide 1602 in GUI 1800. As shown in FIG. 18, GUI 1800 may include visual prompts 708-2 and 708-3, which may be configured to function as described above in reference to GUI 700.

In any of the ways described above, in certain embodiments, system 100 may be configured to automatically select and insert one or more advertisements 704 in GUI 1800 when GUI 1800 is launched. Accordingly, upon launch of GUI 1800 after a user provides user input configured to trigger the launch of GUI 1800, the user may be able to view advertisements 704, such as advertisement 704-3, displayed together with channel guide 1602 in GUI 1800.

In certain embodiments, the advertisement content shown in FIG. 18 (e.g., advertisement 704-3) may represent advertisement content that may be displayed in GUI 1800 during operation in a "launch mode," which may be the mode of operation associated with GUI 1800 immediately following a launch of GUI 1800 for display. In "launch mode," a first category of advertisement content may be displayed together with channel guide 1602 in GUI 1800. As described above, the first category of content may include advertisements that are selected from a general pool of advertisements without restriction to advertisements that are specific to a particular media content channel.

System 100 may be configure to transition from "launch mode" to another mode of operation in response to an occurrence of a predefined event. For example, system 100 may transition from "launch mode" to a "navigation mode" in response to a user navigation event within channel guide 1602. To illustrate, during "launch mode" user navigation input may be received indicating a desire of a user to navigate within channel guide 1602. The navigation may include activating a selector within channel guide 1602, moving channel icons within channel guide 1602, and/or moving a graphical representation of the selector within channel guide 1602.

System 100 may detect an occurrence of a user navigation event within channel guide 1602 in GUI 1800 and respond by transitioning GUI 1800 from operation in "launch mode" to operation in "navigation mode." In "navigation mode," a second category of content may be displayed together with channel guide 1602 in GUI 1800. As described above, the second category of content may include content that is selected from a pool of content that is specific to a particular media content channel, such as information, advertisements, and/or other content specific to the media content channel and/or the media content provider associated with the media content channel.

In the above-described transition from "launch mode" to "navigation mode" in response to a detection of a user navigation event in channel guide 1602, advertisements 704 displayed together with channel guide 1602 during "launch mode" may be replaced with channel-specific content displayed together with channel guide 1602 during "navigation mode." The replacement may be accomplished in any suitable way, including in any of the ways described herein.

Figure 19:
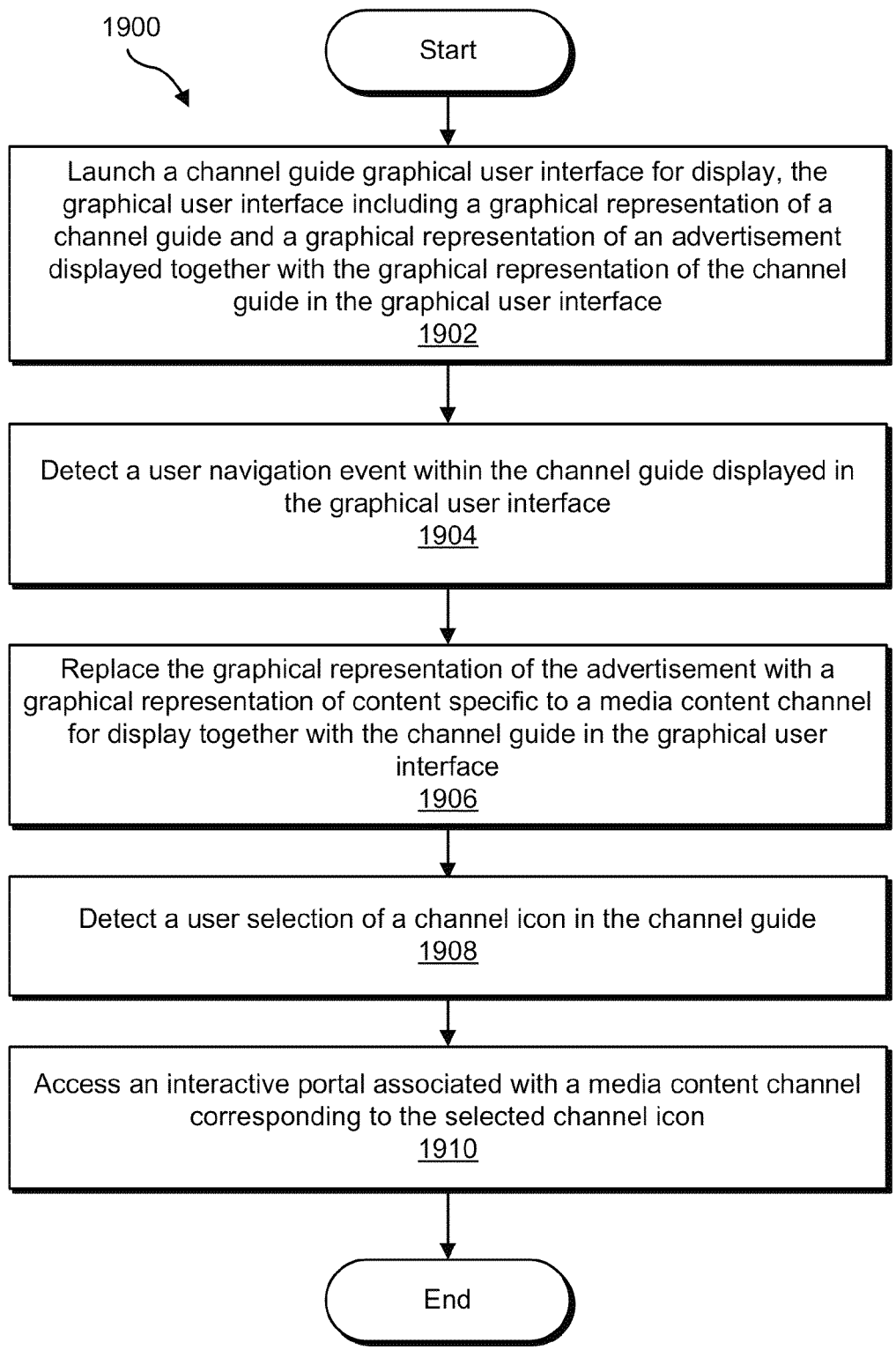
FIG. 19 illustrates an exemplary channel guide user interface advertising method according to principles described herein.

FIG. 19 illustrates an exemplary channel guide user interface advertising method 1900 according to principles described herein. While FIG. 19 illustrates exemplary steps according to one embodiment, other embodiments may omit, add to, reorder, and/or modify any of the steps shown in FIG. 19. In certain embodiments, one or more of the steps shown in FIG. 19 may be performed by system 100, delivery subsystem 202, access subsystem 204, and/or device 500.

In step 1902, a channel guide GUI is launched for display. Step 1902 may be performed in any of the ways described herein. The GUI may include a graphical representation of a channel guide and a graphical representation of an advertisement displayed together with the graphical representation of the channel guide in the GUI. Exemplary views of such a GUI are illustrated in FIGS. 7, 8, and 18.

In step 1904, a user navigation event is detected within the channel guide displayed in the GUI. Step 1904 may be performed in any of the ways described herein, and the user navigation event may include any of the exemplary user navigation events described herein.

In step 1906, the graphical representation of the advertisement is replaced with a graphical representation of content specific to a media content channel for display together with the channel guide in the GUI. Step 1906 may be performed in any of the ways described herein, and the content specific to the media content channel may include any of the channel-specific content described herein. An exemplary view of such a GUI is illustrated in FIG. 9. In certain examples, the replacement of the advertisement may be associated with a transition from a "launch mode" of the GUI to a "navigation mode" of the GUI as described above.

In step 1908, a user selection of a channel icon in the channel guide is detected. Step 1908 may be performed in any of the ways described herein.

In step 1910, an interactive portal associated with a media content channel corresponding to the selected channel icon is accessed in response to the detected user selection. Step 1910 may be performed in any of the ways described herein.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:

launching, by a media content access system, a graphical user interface for display, the graphical user interface initially including a graphical representation of a channel guide presented relative to a graphical representation of a stage, the graphical representation of the channel guide comprising a three-dimensional grid matrix of a plurality of channel icons, the plurality of channel icons arranged in both a plurality of horizontal rows and a plurality of columns perpendicular to the horizontal rows, the plurality of channel icons representing a plurality of media content channels through which media content is accessible by the media content access system and arranged in the plurality of horizontal rows in the three-dimensional grid matrix with a first horizontal row of channel icons positioned at a forefront of the three-dimensional grid matrix and a plurality of other horizontal rows of channel icons positioned at progressively increasing depths from the forefront of the three-dimensional grid matrix, and detecting, by the media content access system, a user navigation event within the channel guide displayed in the graphical user interface, the user navigation event comprising a command to scroll the three-dimensional grid matrix of channel icons relative to the stage; and replacing, by the media content access system in response to the user navigation event, the first horizontal row of channel icons positioned at the forefront of the three-dimensional grid matrix by directionally scrolling the three-dimensional grid matrix of channel icons relative to the stage.

2. The method of claim 1, further comprising:
transitioning, by the media content access system in response to another user navigation event, from a launch mode of operation to a navigation mode of operation for the graphical user interface.

3. The method of claim 1, wherein the plurality of horizontal rows of channel icons visually tapers with increased depth in the three-dimensional grid matrix.

4. The method of claim 1, wherein:
the stage is positioned at the forefront of the three-dimensional grid matrix;
the first horizontal row of channel icons is initially positioned on the stage; and
the plurality of other horizontal rows of channel icons are initially positioned off of the stage.

5. The method of claim 4, wherein the graphical representation of the stage includes a reflection of at least one of the channel icons positioned on the stage.

6. The method of claim 1, wherein the directionally scrolling comprises:
moving the first horizontal row of channel icons off of the stage; and
moving a new horizontal row of channel icons onto the stage.

7. The method of claim 1, further comprising:
detecting, by the media content access system, a user selection of a channel icon within the three-dimensional grid matrix of channel icons displayed in the graphical user interface; and
accessing, by the media content access system, an interactive portal associated with a media content channel within the plurality of content channels and corresponding to the selected channel icon.

8. The method of claim 1, wherein:
the graphical user interface further includes a graphical representation of an advertisement displayed together with the channel guide in the graphical user interface;
the advertisement is selected for display from a pool of advertisements without restriction to a media content channel within the plurality of media content channels; and
content specific to the media content channel within the plurality of media content channels is selected from a pool of content with restriction to content that is specific to the media content channel within the plurality of media content channels.

9. The method of claim 1, embodied as computer-executable instructions on at least one tangible computer-readable medium.

10. The method of claim 1, wherein the plurality of channel icons are arranged in the plurality of horizontal rows in the three-dimensional grid matrix such that each horizontal row in the plurality of horizontal rows contains multiple channel icons.

11. The method of claim 1, wherein a channel icon included in the plurality of channel icons comprises at least one of a media content provider logo and a media content channel logo.

12. A system comprising:
a media content access facility configured to access media content distributed over one or more of a plurality of media content channels;
a channel guide facility configured to maintain channel data representing the plurality of media content channels; and
a user interface facility communicatively coupled to the media content access facility and the channel guide facility, the user interface facility configured to
access and utilize the channel data to generate and launch a graphical user interface for display, the graphical user interface including
a graphical representation of a channel guide presented relative to a graphical representation of a stage, the graphical representation of the channel guide comprising a three-dimensional grid matrix of a plurality of channel icons arranged in both a plurality of horizontal rows and a plurality of columns perpendicular to the horizontal rows, the plurality of channel icons representing the plurality of media content channels and arranged in the plurality of horizontal rows in the three-dimensional grid matrix with a first horizontal row of channel icons positioned at a forefront of the three-dimensional grid matrix and a plurality of other horizontal rows of channel icons positioned at progressively increasing depths from the forefront of the three-dimensional grid matrix, and
detect a user navigation event within the channel guide displayed in the graphical user interface, the user navigation event comprising a command to scroll the three-dimensional grid matrix of channel icons relative to the stage, and
replace, in response to the user navigation event, the first horizontal row of channel icons positioned at the forefront of the three-dimensional grid matrix by directionally scrolling the three-dimensional grid matrix of channel icons relative to the stage.

13. The system of claim 12, further comprising an interactive portal access facility communicatively coupled to the user interface facility and configured to access an interactive portal associated with a media content channel within the plurality of media content channels.

14. The system of claim 13, wherein:
the user interface facility detects a user selection of a channel icon within the three-dimensional grid matrix of channel icons displayed in the graphical user interface; and
the interactive portal facility accesses the interactive portal associated with the media content channel within the plurality of media content channels, the media content channel corresponding to the selected channel icon.

15. The system of claim 12, wherein the user interface facility is further configured to transition from a launch mode of operation to a navigation mode of operation for the graphical user interface in response to another user navigation event.

16. The system of claim 12, wherein:
the stage is positioned at the forefront of the three-dimensional grid matrix;
the first horizontal row of channel icons is initially positioned on the stage; and
the plurality of other horizontal rows of channel icons is initially positioned off of the stage.

17. The system of claim 12, implemented on a set-top box device configured to access a subscriber television service.

18. A system comprising:
a media content access facility configured to access media content distributed over one or more of a plurality of media content channels;
a channel guide facility configured to maintain channel data representing the plurality of media content channels;
a user interface facility communicatively coupled to the media content access facility and the channel guide facility, the user interface facility configured to access and utilize the channel data to generate and launch a graphical user interface for display, the graphical user interface including
a graphical representation of a channel guide presented relative to a graphical representation of a stage, the graphical representation of the channel guide comprising channel icons representing the plurality of media content channels, the channel icons arranged to form a three-dimensional grid matrix view of the channel icons in both a plurality of horizontal rows and a plurality of columns perpendicular to the horizontal rows, the plurality of horizontal rows of channel icons comprising a first horizontal row of channel icons positioned at a forefront of the three-dimensional grid matrix view and a plurality of other horizontal rows of channel icons positioned at progressively increasing depths from the forefront of the three-dimensional grid matrix view;
wherein the user interface facility is further configured to:
detect a user navigation event within the channel guide displayed in the graphical user interface, the user navigation event comprising a command to scroll the three-dimensional grid matrix of channel icons relative to the stage, and
replace, in response to the user navigation event, the first horizontal row of channel icons positioned at the forefront of the three-dimensional grid matrix by directionally scrolling the three-dimensional grid matrix of channel icons relative to the stage.

19. The system of claim 18, wherein:
the graphical user interface further includes a graphical representation of an advertisement displayed together with the channel guide in the graphical user interface; and
the user interface facility
detects another user navigation event within the channel guide displayed in the graphical user interface, and
replaces, in response to the another user navigation event, the graphical representation of the advertisement with a graphical representation of content specific to a media content channel within the plurality of media content channels.

* * * * *